United States Patent [19]
Katzela et al.

[11] Patent Number: 5,872,773
[45] Date of Patent: Feb. 16, 1999

[54] VIRTUAL TREES ROUTING PROTOCOL FOR AN ATM-BASED MOBILE NETWORK

[75] Inventors: Irene Katzela, New York, N.Y.; Malathi Veeraraghavan, Atlantic Highlands, N.J.

[73] Assignee: Lucent Technologies Inc., Murray Hill, N.J.

[21] Appl. No.: 650,097

[22] Filed: May 17, 1996

[51] Int. Cl.[6] .................................................. H04L 12/44
[52] U.S. Cl. ........................ 370/256; 370/408; 370/409; 370/399
[58] Field of Search .................................. 370/203, 254, 370/255, 256, 257, 258, 351, 389, 395, 392, 400, 401, 402, 403, 404, 405, 409, 410, 408, 399, 252, 310, 315, 328, 338, 349, 398; 340/825.03, 826

[56] References Cited

U.S. PATENT DOCUMENTS 5,623,495   4/1997   Eng et al. ................................ 370/397

OTHER PUBLICATIONS

"On Routing in ATM Networks", pp. 50–98. Date unknown.
"A wireless broadband ad–hoc ATM local–area network", J.C. Baltzer AG, Science Publishers, (1995), pp. 161–174.
"Routing in Multihop Packet Switching Networks: Gb/s Challenge", IEEE Network, May/Jun. 1995, pp. 38–61.
"The Sink Tree Paradigm: Connectionless Traffic Support on ATM LANs", IEEE, by R. Cohen et al., 1994, pp. 821–828.
ATM Forum 94–0471R9 PNNI Draft Specification, PNNI SWG, by D. Dykeman et al., pp. 1–182. Date unknown.

*Primary Examiner*—Huy D. Vu

[57] ABSTRACT

The present invention is a system and method for routing cells in a wireless communications network, wherein the communications network includes a plurality of switching nodes and the cells are routed according to destination-rooted virtual path identifier (VPI) trees. The present invention includes a routing protocol for determining preestablished VPI trees rooted at each destination node. The routing protocol manages the routes of these trees, while ensuring that there are at least two VPI trees from each source to each destination for reliability reasons, and that each destination node has multiple VPI trees for load-balancing reasons. The routing protocol includes an off-line procedure for the determination of the initial VPI trees. In order to handle changes in network traffic and conditions, the routing protocol updates the routes of the VPI trees in a dynamic and distributed fashion. These update procedures are triggered by congestion, link/node failures and link/node additions.

40 Claims, 11 Drawing Sheets

EXAMPLE NETWORK

PRIMARY VPI TREE

STEP 1

STEP 2

PRIMARY TREE $V_{n1}$

G"(S', E')

G'(S, L-E₁)

SECONDARY TREE $V_{n2}$

VIRTUAL TREES ROUTING PROTOCOL FOR AN ATM-BASED MOBILE NETWORK

RELATED APPLICATIONS

The present patent application is related to U.S. patent application, Serial No. 08/412,400, entitled A PACKET BASED TELECOMMUNICATIONS NETWORK, filed Mar. 28, 1995, Ser. No. 08,490,980, entitled SIGNALING AND CONTROL ARCHITECTURE FOR AN AD-HOC ATM LAN filed Jun. 15, 1995 and Ser. No. 08/490,981, entitled METHOD AND APPARATUS FOR ROUTING ATM CELLS IN AN AD-HOC ATM LAN, filed Jun. 15, 1995, those applications having at least one common inventor and common assignee and being incorporated herein by reference.

FIELD OF THE INVENTION

The present invention relates generally to telecommunications networks with mobile end-users, and more particularly to the routing of ATM cells in such networks.

BACKGROUND OF THE INVENTION

ATM is emerging as a promising technology for multimedia applications in wired networks. However, much development remains before seamless interworking between wireless (mobile) hosts and wired ATM networks can be offered. One aspect of ATM that requires further development is the problem of routing in ATM-based mobile networks.

As would be understood by a person skilled in the art, ATM is a connection-oriented technology. This implies that there is a connection establishment phase prior to data exchange, and a connection release phase after data exchange. In mobile networks, as end points move, segments of connections need to be torn down and reestablished. Several different connection rerouting methods for hand-offs in mobile networks have been considered in the prior art. Most of these schemes require segment release and setup during hand-offs. Others schemes avoid segment release and setup during hand-offs but require extra segments of a connection tree (from a root switch to a set of base stations to which the mobile could potentially move) to be established during setup.

Connectionless networks completely avoid this problem of having to tear-down and setup segments or establish extra segments for hand-offs. Since routing in connectionless networks is based on end host addresses, a simple update of the current location of the end host is sufficient to handle mobility.

In response to observations regarding this suitability of connectionless networking to support mobility, a networking concept for an ATM-based mobile network ;vas developed by Bell Laboratories to emulate connectionless networks using ATM technology. See, for example, related U.S. patent applications, Ser. No. 08/412,400, entitled A PACKET BASED TELECOMMUNICATIONS NETWORK, filed Mar. 28, 1995, Ser. No. 08,490,980, entitled SIGNALING AND CONTROL ARCHITECTURE FOR AN AD-HOC ATM LAN filed Jun. 15, 1995 and Ser. No. 08/490,981, entitled METHOD AND APPARATUS FOR ROUTING ATM CELLS IN AN AD-HOC ATM LAN, filed Jun. 15, 1995.

Typically, in the commonly adopted connection-oriented usage of ATM, the VPI (Virtual Path Identifier) and VCI (Virtual Channel Identifier) fields in the cell header are interpreted as logical channels on ATM links. During connection setup prior to data exchange, translation table entries that map an incoming port/VPI/VCI to an outgoing port/VPI/VCI are created at each transit ATM switch. During data transfer, ATM cells are routed through each switch by matching the VPI/VCI fields of the cell headers with entries in these translation tables.

In the ATM-based mobile network referenced above, also referred to as the BAHAMA LAN, instead of using this common interpretation of the VPI field, VPIs are assigned as addresses of network nodes (switches). All cells with a given VPI are routed to the same destination switch. This is accomplished by preestablishing VPI sink (destination-rooted) trees. Individual connections within a VPI tree are distinguished using VCIs. This type of networking emulates "connectionless" data transfer in that packets are routed as per the destination address in the packet (cell) headers and no explicit segment setup/release is required before/after data exchange or during hand-offs.

FIG. 1 shows an exemplary connectionless ATM-based mobile LAN 10 of the type just described. The network 10 consists of two types of network elements: Portable Base Stations (PBSs) 12 and mobile end points 14. Each PBS 12 combines ATM switching functionality with wireless access interfaces (radio port functionality) providing microcell coverage. Mobile end points 14 are assumed to be portable laptops with wireless ATM capability. The PBSs 12 in FIG. 1 are represented by the numbered boxes and the mobile end points 14 are represented by the X, Y, and Z circles. Also shown in FIG. 1 is the VP/VC 16 usage in the exemplary LAN 10. For example, VPI 9$a$ and VPI 9$b$ are assigned to PBS 9. In other words, all cells with VPI 9$a$ and VPI 9$b$ are routed to the destination PBS 9. Associated with each VPI is a unique route through the network (from each source), thus forming a tree with the destination as the root. To distinguish cells from different connections, each PBS 12 controls the assignment of VCIs associated with VPIs that terminate at that PBS. For example, in FIG. 1, (VPI 9$a$; VCI 1) and (VPI 9$b$; VCI 2) denote X-to-Y connections for these mobile end points 14, and (VPI 9$a$; VCI 3) and (VPI 9$b$; VCI 4) denote Z-to-Y connections. A simple connection admission (not setup, since there is no hop-by-hop switch configuration prior to data exchange) procedure, consisting of an end-to-end handshake between the source PBS and the destination PBS, is executed to have the destination PBS select a VCI incoming on one of its assigned VPIs. A similar sink tree solution was proposed by R. Cohen, B. V. Patel, F. Schaffa and M.-Villebeek-LeMair, in "The Sink-Tree Paradigm: Connectionless Traffic Support on ATM LANs," Proc. of IEEE Infocom '94, Vol. 2, pp. 821–828, June 1994, for strictly connectionless data networking, however, the sink-tree solution above, however, has no per-connection admission procedure which limits the number of end hosts supported. It also has no mechanisms for supporting QoS guaranteed connections.

VPI trees in the exemplary connectionless ATM-based mobile LAN 10 are allowed to be partial, i.e., not all PBSs 12 in the network are located on every VPI tree. Multiple VPIs are assigned to each PBS to ensure that every PBS is on at least two of the VPI trees (for reliability reasons) assigned to a given destination PBS. Given that the VPI trees are preestablished (provisioned), there is need for a procedure to compute and update the routes of these VPIs with changing conditions in the LAN.

In order to better understand the meaning of provisioning VPI trees, let $p_{im}$ denote the $m^{th}$ port of the node i and $(p_{im},p_{jm'})$ represent the physical link between port $P_{im}$ on PBS i and port $p_{jm'}$ on PBS j in the direction from PBS i to PBS j. If VPI V is routed through the link $(p_{in},p_{jm'})$, then a data table called the Transit VPIs data table $T_1$ is needed in PBS i to map VPI V to port $p_{jm'}$. Each PBS through which VPI V passes needs a corresponding entry for VPI V in its Transit VPIs data table $T_1$. When an ATM cell arrives at a PBS, the VPI field in the cell header is matched with an entry in table $T_1$ and the cell routed to the corresponding port. FIG. 2 shows the entries in the Transit VPIs data tables 20 at each PBS 12 through which VPI 9a passes. As can be seen each Transit VPI data table 20 includes a VPI entry 22 and a corresponding port entry 24.

Thus, to provision VPI trees, the routes of these VPI trees must be first computed, and then entries set in the Transit VPIs data table $T_1$ at each node in the network. Given that the instant ATM mobile LAN supports mobile end points, VPI routes cannot be static and must be constantly updated to meet changing traffic and network conditions. Thus, a routing protocol should include both a computation of initial tree assignments, and a scheme to update these routes.

Besides the Transit VPIs data table $T_1$, each PBS stores other data tables to support the control and management plane algorithms of the subject ATM mobile LAN. A list of exemplary tables is shown in Table 1. The Port/capacity data table $T_2$ stores the identifier of the PBS connected to each of its ports. Also, for each port, it stores the link capacity and the current usage value. Since VPI trees are allowed to be partial, in that only a subset of PBSs may be located on a VPI tree terminating at a given PBS P, a third table $T_3$, the Destination-VPIs table lists the identifiers of all the PBSs located on each of the VPI trees rooted at PBS Finally, given a destination PBS ID, a source PBS may be located on one or more VPI trees terminating at the destination PBS. The PBS-to-VPIs mapping table, $T_4$, stores this information.

An extension to the above-stated problem (compute the routes of initial VPI trees and then update these routes as network and traffic conditions change) is to determine resource allocation for these VPI trees. In typical ATM networks, virtual path connections are provisioned between pairs of switches a priori and allocated bandwidth. Several algorithms have been proposed to perform effective a priori bandwidth allocation to these virtual path connections. The question of whether bandwidth (and other resources) can be allocated a priori in a "VPI trees-based network" is related to the control plane schemes used in the subject ATM mobile LAN. In "A Wireless Broadband Ad-Hoc ATM Local-Area Network," by K. Y. Eng, M. J. Karol, M. Veeraraghavan, E. Ayanoglu, C. B. Woodworth, P. Pancha, and R. A. Valenzuela, ACM/Baltzer Journal on Wireless Networks, vol. 1, no. 2, 1995, two control plane schemes were described for providing QoS guarantees during connection admission. The first scheme is to perform a hop-by-hop resource checking procedure along the route of the VPI tree before admitting the connection. This scheme requires no bandwidth preallocation. The second scheme is to preallocate a priori link (bandwidth) and node (buffer) resources to each PBS, for all the links and nodes in the network. During connection admission, the root PBS checks its allocations for each link and node on the route from the source PBS to itself to verify resource availability for the requested QoS measures. Based on which scheme is assumed in the control plane, the problem statement of maintaining VPI trees includes or excludes the a priori bandwidth allocation aspect. Let us assume that the present invention assumes the first control plane scheme, which requires no a priori bandwidth allocation. Thus, the problem to be solved by is simply to compute the routes of the initial VPI trees, program the data tables, and update these routes as needed. Existing routing protocols are not, however, practically applicable to the problems/requirements of the described connectionless ATM mobile LAN.

Routing in ATM networks that use the traditional interpretation of VPI/VCIs is handled in many different ways. In such networks, since a connection is established before data transfer, no per-node route determination is required for the ATM cells. Routing in the user plane becomes simply a matter of matching the VPI/VCI fields of the cell headers with entries in the port/VPI/VCI translation tables (that are set and cleared by control plane signaling procedures during connection setup and release) stored at each switch on the end-to-end route. However, a routing problem exists in the control plane. During connection setup, upon receiving signaling messages requesting a connection, each ATM switch needs to determine the route to reach the destination and thus select the appropriate outgoing port for the connection.

Two approaches to table-based routing that are applicable to ATM networks have been described by C. Baransel, W. Dobosiewicz and P. Gburzynski, "Routing in Multihop Packet Switching Networks: Gb/s Challenge," IEEE Network Magazine, pp. 38–61, 1995, optimal routing and shortest-path routing. The optimal table-based routing scheme uses a network manager to compute routes based on current loading conditions and predicted call arrival/departure patterns. This typically involves periodically solving a network-wide optimization problem for some objective function, such as blocked call rate, subject to a set of constraints. The computed routes are then downloaded to the switches. When a signaling request for a connection setup arrives at a switch, it simply consults its routing table (that was preloaded by the routing procedure) to determine the next switch in the route. In ATM networks, the ITU-T signaling standard for public ATM networks assumes that routing data is somehow available to switches. There is, however, no counterpart ITU-T standard to dynamically determine the route. For small networks, routing data can be entered manually, but for large networks, it is assumed that routing tables are computed by one or more centralized traffic management stations using this optimal routing scheme.

A second approach is the shortest-path table-based routing scheme which is used in the PNNI (Private Network Node/Network Interface) routing protocol defined by the ATM Forum in 94-0471R9, "Private-Network Node Interface Phase 1 Draft Specification". Here, periodic topology state packets are exchanged between ATM switches. When a signaling request for connection setup arrives at a switch, it uses the network topology and state information (updated by the PNNI routing protocol) to select a set of switches through which to route the connection using an on-the-fly path determination algorithm, such as Dijkstra's shortest path algorithm. Hierarchical ordering of ATM switches (for example, peer groups) is used to scale this procedure for large networks.

A combination of these two schemes is to have virtual path connections (VPCs) provisioned between every pair of ATM switches. Bandwidth allocation and routing of these VPCs are typically determined using centralized optimizations. Most on-demand connections are then routed on these direct links (VPCs). In addition, in case the direct link is fully loaded, dynamic routing schemes, such as Least Loaded Routing (LLR), "Routing in Communications Networks," M. Steenstrup, Editor, Prentice Hall 1995, Chapter 2, can be used to find alternate paths (routed through one via switch). This latter step can be viewed as a shortest-path computation.

None of the above three approaches (optimal, shortest-path, or combination) is practically adoptable in the connectionless ATM mobile LAN for the following reasons. First, the optimal table-based routing scheme and the combination scheme require a centralized management station, which is counter to important goals of "simplicity and low-cost" in the ATM mobile LAN. Next, the shortest-path table-based approach can be used, but would require a "three-phase" solution to the problem. In other words, to emulate connectionless networking, there should be no "connection setup" phase for hop-by-hop switch configurations prior to data exchange. This is counter to the shortest-path scheme which is based on determining the routes of connections during connection setup. Thus, to be able to use the PNNI routing scheme, a three-phase approach is required: first, topology state packets are exchanged periodically; second, based on this information, synchronous route computations are required to setup the VPI trees (configure fabrics with Transit VPIs data table ), third, connection admission is used to select a VCI and a VPI tree for the connection prior to data exchange. As would be understood, this three-phase solution may be avoided by using a distance-vector based algorithm, like RIP (Routing Information Protocol), "Routing in Communications Networks," M. Steenstrup, Editor, Prentice Hall 1995, Chapter 3, rather than a link-state algorithm for the routing protocol.

RIP is a commonly used routing protocol in connectionless (IP) networks. However, there are two reasons why RIP is not suitable for use in the connectionless ATM mobile LAN. First, unlike IP networks, ATM networks guarantee sequenced delivery. This implies that asynchronous updates of routing data in nodes cannot be permitted. Secondly, in IP networks, if a link fails, and an arriving IP packet needs to be routed on the failed link (as per the routing data), the node can always use other neighbors to forward this IP packet. In the subject ATM mobile LAN, this flexibility is not available, since ATM cell sequence needs to be maintained. In other words, in table T1 there is only one port corresponding to each VPI, with no alternative options. This, in turn, creates a need to provision at least two disjoint end-to-end paths between every pair of nodes, a constraint not met by RIP.

Given the constraints of maintaining sequenced delivery and requiring disjoint paths, it can be seen that none of the existing routing protocols described above is suitable for use in a type of connectionless ATM mobile LAN, similar to the BAHAMA LAN. Accordingly, there is need for a new routing protocol for this type of ATM-based wireless network which is capable of adapting to changing conditions therein.

SUMMARY OF THE INVENTION

The present invention is a system and method for routing cells in a wireless communications network, wherein the communications network includes a plurality of switching nodes and the cells are routed according to destination-rooted virtual path identifier (VPI) trees. The present invention includes a routing protocol for determining preestablished VPI trees rooted at each destination node. The routing protocol manages the routes of these trees, while ensuring that there are at least two VPI trees from each source to each destination for reliability reasons, and that each destination node has multiple VPI trees for load-balancing reasons. The routing protocol includes an off-line procedure for the determination of the initial VPI trees. In order to handle changes in network traffic and conditions, the routing protocol updates the routes of the VPI trees in a dynamic and distributed fashion. These update procedures are triggered by congestion, link/node failures and link/node additions.

BRIEF DESCRIPTION OF THE FIGURES

For a better understanding of the present invention, reference may be had to the following description of exemplary embodiments thereof, considered in conjunction with the accompanying drawings, in which.

DETAILED DESCRIPTION

Figure 1:
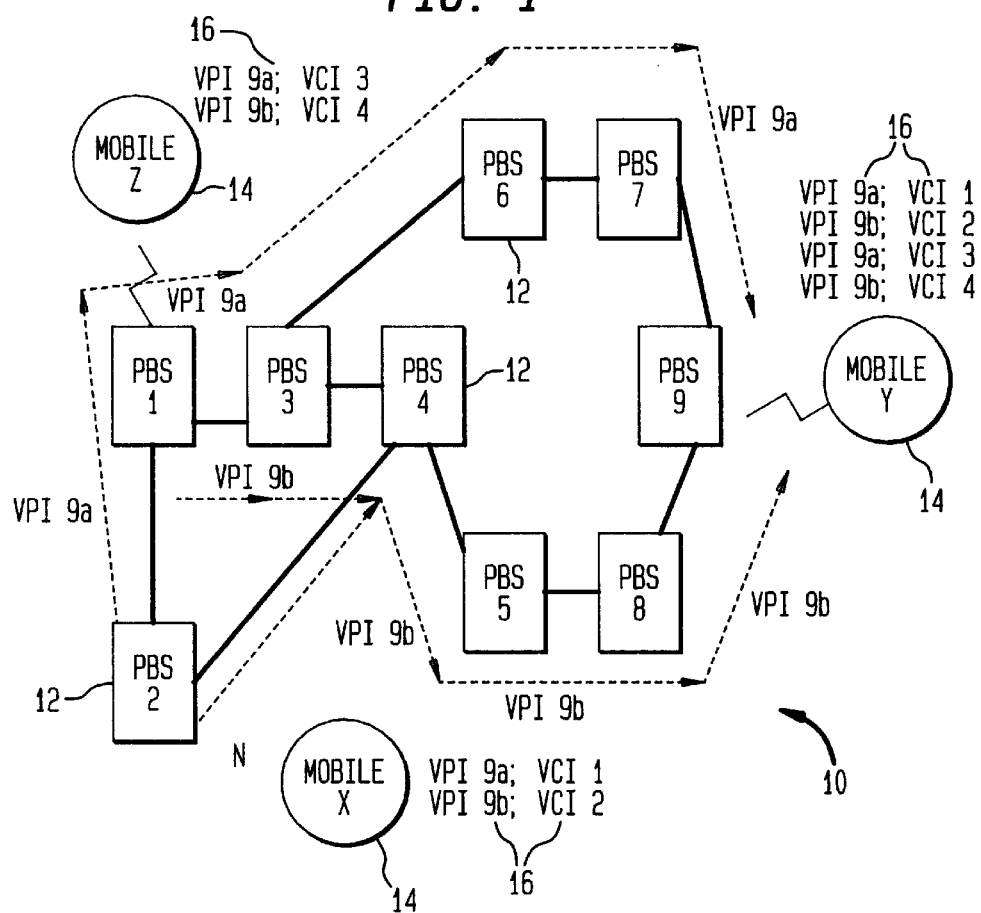
FIG. 1 shows one embodiment of an exemplary wireless ATM network used in accordance with the present invention.

Although the present invention is described with reference to a specific embodiment of a connectionless ATM mobile LAN, it would be understood that the virtual tree routing protocol (VTRP) of the present invention may be adapted for use with other ATM networks having similar destination based routing schemes. All such variations are intended to be included within the scope of the present invention.

The distributed VTRP approach of the present invention addresses changing traffic and network conditions in a connectionless ATM mobile LAN. Unlike RIP, which is used for both periodic constant updates (needed to achieve minimum-cost optimal routes) and triggered updates, VTRP only operates when triggered by a congestion, failure, or restoral condition. The present invention includes an off-line procedure for computing an initial set of trees rooted at each PBS in an exemplary wireless ATM network. Next, the VTRP procedures are described to update the routes of these VPI trees with changing traffic and network conditions.

Initial Trees Computation Procedures

Prior to describing the off-line procedure for the computation of the initial VPI trees, a set of criteria is listed to be met by these initial trees. Primarily, a set of VPI trees rooted at each PBS is needed to be found such that there is connectivity between each pair of nodes. Secondly, for reliability reasons, it is required that each PBS is on at least two of the VPI trees assigned to a given destination PBS. This implies that the two routes from a source PBS to the destination PBS must be disjoint. A third consideration is that the VPI trees should be routed in such a way that when these routes are traced during an admission procedure for connections with QoS requirements, the probability of success in finding the required resources along the route is maximized. This load-balancing criterion requires spreading the VPI trees on as many network links as possible.

Given this last criterion, it would be understood that the use of Minimal Spanning Trees (MSTs) would be disallowed for use in the present invention. If an MST is computed, and rooted at each node to form the VPI sink trees, then the same links will experience traffic between different pairs of nodes. This would lead to repeated congestions. Hence, instead of MSTs, all-pairs shortest-paths as described, for example, in "Data Networks," D. Bertsekas and R. Gallagher, Prentice-Hall, 1987, are used as the basis for these VPI trees.

In considering the disjointedness criterion, it would be understood that edge disjoint paths are often used in communication networks to achieve reliability of transmission between a given source and destination. Prior art references describe algorithms to compute K shortest paths between a given source and destination such that they are maximally disjoint. These paths can be combined to form trees by avoiding loops. If there is no limit on the number of trees, the K shortest paths for all node pairs can be readily combined to form trees. However, there exists an additional constraint on the number of trees because PBSs in the subject wireless ATM LAN do not support VPI translations. Thus, a scheme of finding the K disjoint shortest paths and combining them cannot be used.

Two options were identified to compute these trees given the above described criteria and constraints. A first option is to solve an optimization problem for an objective function, such as total blocked traffic, under the constraints stated above. However, this typically requires input data, such as predicted traffic patterns, which is not easily determined for new PCS applications.

Figure 3A:
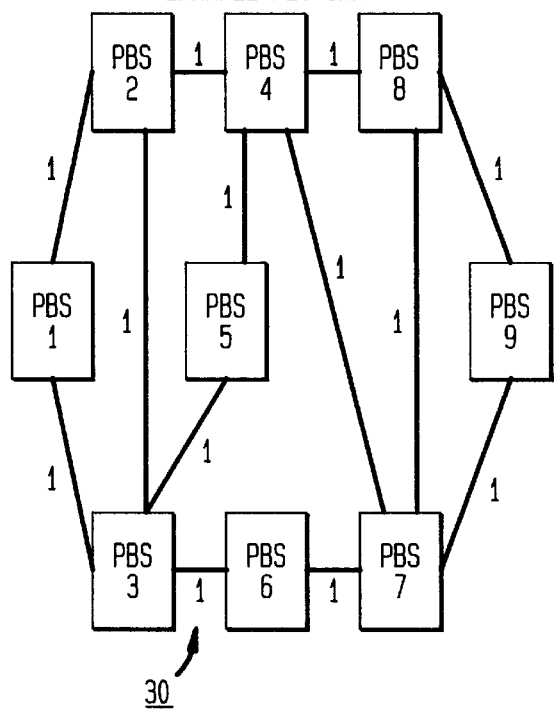
FIGS. 3A and 3B show one representation of the exemplary ATM wireless network and an associated primary VPI tree.
Figure 3B:
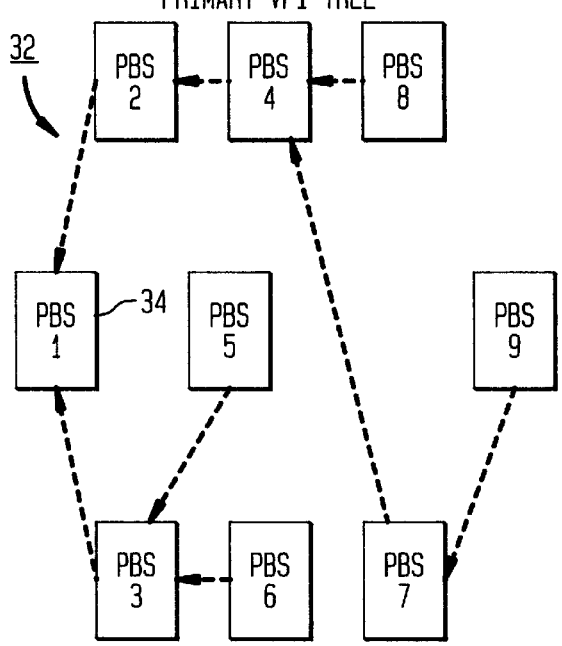

A second option, in accordance with the present invention, is to design heuristics to compute these initial VPIs trees. This is started by computing the all-pairs shortest-paths using, for example, the Floyd-Warshall algorithms also described in "Data Networks," D. Bertsekas and R. Gallagher, Prentice-Hall, 1987, assuming equal weights on all links. This forms a set of primary trees, one rooted at each node. Three (exemplary) heuristics are applied to determine the secondary trees rooted at each node. Based on the number of nodes, and the VPI space distribution, if more than four trees are required to be rooted at a destination node, then these heuristics can be extended. FIG. 3A shows an example network 30, while FIG. 3B shows a corresponding shortest-paths primary VPI tree 32 rooted at node PBS 1 (34) for the example network 30.

The three heuristics are used to determine the secondary trees for a given destination. The first and second heuristics find the secondary trees by avoiding links that are heavily used in the primary trees. This, in effect, discourages the algorithm from using links that have already been selected for the routes in the primary trees and also helps with both the reliability and load-balancing criteria stated earlier. The difference between the first and second heuristics is that in the first heuristic, the weights used for the computation of the secondary trees reflect the paths in all the primary trees, whereas, the second heuristic, the weights are determined by only counting the paths in the primary trees to the destination node for which the secondary tree is being computed. The effect is that the load balancing criterion is emphasized in the first heuristic, and the disjointedness criterion, in the second. Finally, the third heuristic finds the secondary tree for each destination that is maximally edge disjoint from the primary tree for that destination.

Figure 4A:
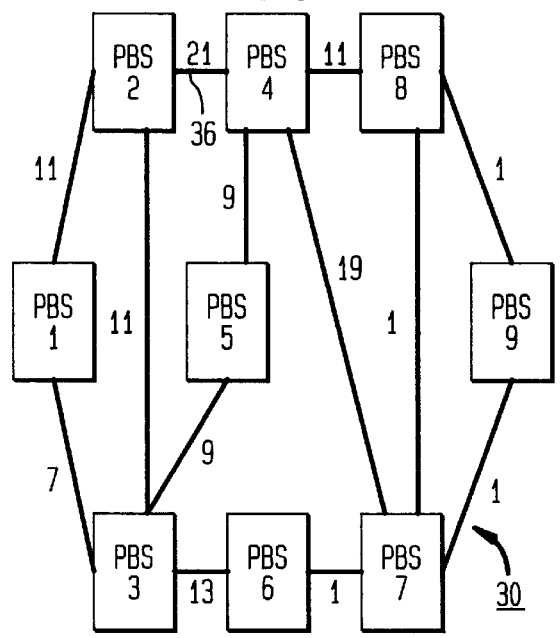
FIGS. 4A and 4B show the exemplary network having weighted links and a corresponding secondary tree for according to heuristic one.

As mentioned, the first heuristic or Heuristic One computes a set of secondary trees, one rooted at each node. In one exemplary embodiment, Heuristic One consists of the following two steps when the network is viewed as a graph G, which is a function of a set of vertices/nodes S and associated links L or G(S,L). In step 1, the weights in the edges of the graph G(S,L) are updated as follows: For each edge $e_{ij}$ in the graph G(S,L), the new assigned weight is $(w+\Sigma p_{ij})$ where $p_{ij}$ is the number of paths, in all the primary trees that use edge $e_{ij}$. For the example network 30 of FIG. 3, FIG. 4A shows the weight on each link determined by adding the number of paths in all the primary trees (one rooted at each node) traversing the link. Thus, 21 paths traverse the link 36 from PBS 4 to PBS 2 in all the primary trees. Note that in FIG. 3B, only one primary tree was shown for that primary tree rooted at PBS 1. It would be understood that other primary trees are similarly computed.

Figure 4B:
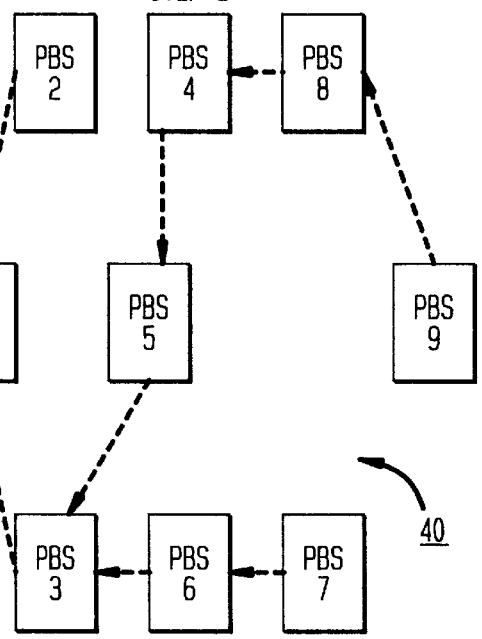

In Step 2, the all-pairs shortest-paths algorithm was run for the graph G(S,L). FIG. 4B shows the secondary tree 40 computed for the example network 30. While this tree uses the more lightly loaded links, it does not achieve disjointedness. For example, the same link from PBS 2 to 1 is present in both the primary tree 32 shown in FIG. 3B and the secondary tree 40 shown in FIG. 4B.

Figure 5A:
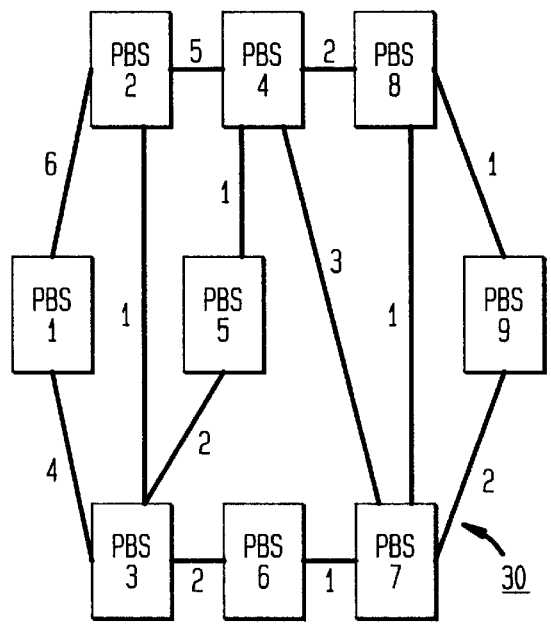
FIG. 5A and 5B show the exemplary network having weighted links and a corresponding secondary tree for according to heuristic two.

For Heuristic Two, for each node n in the network, a secondary tree rooted at n is created by performing the following steps. In step 1 a set of edges $E_n$ is determined through which the primary VPI tree $V_{nl}$ rooted at node n is routed. Referring to FIG. 5A, for example, the edges $e_2l$, $e_{42}$, $e_{84}$, $e_{74}$, $e_{97}$, $e_{53}$, $e_{31}$ and $e_{63}$ belong to the set $E_1$. These edges are used in the primary VPI tree rooted at PBS 1.

In step 2, the weights of the edges $e_{ij} \in E_n$ in the graph G(S,L) by assigning new weights $w'_{ij}=w_{ij}+p_{ij}$, where $p_{ij}$ is the number of paths in the primary VPI sink tree $V_{nl}$ that traverse the edge $e_{ij}$ and $w_{ij}$ represent the weights used to compute the primary trees (assumed to be 1 for all edges $e_{ij}$). For the edges that are not included in $E_n$, the weight remains the same. For example, in FIG. 5A, the link $e_{42}$ is assigned a weight 5, since four paths (from nodes 9, 8, 7, and 4 to node 1) use this edge in the primary tree rooted at node 1.

Figure 5B:
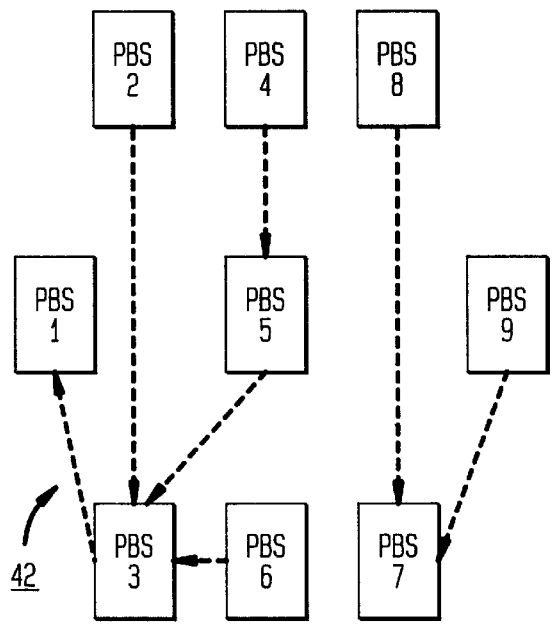

In step 3, a shortest-paths algorithm, such as Dijkstra's, is run on the new graph to find the shortest paths from all nodes to the destination node. As shown in FIG. 5B, this yields the secondary VPI tree $V_{12}$42 rooted at node 1. This tree is "more disjoint" from the primary tree relative to the secondary VPI tree computed in heuristic 1, but may not be as well load-balanced.

Figure 6A:
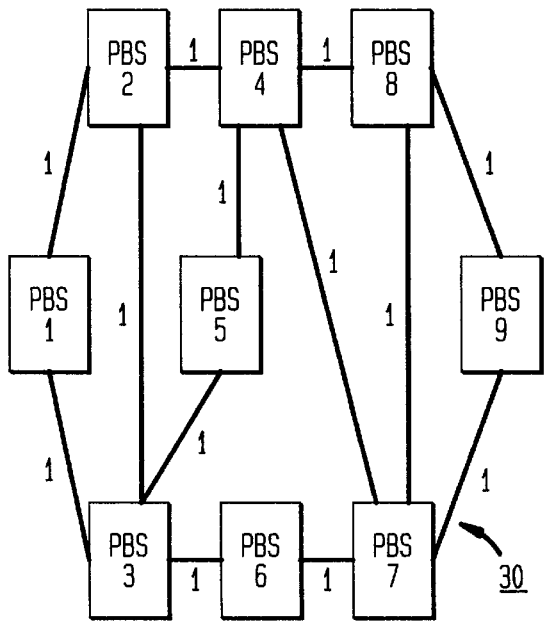
FIGS. 6A–6F show the exemplary network having various representations of graphs for heuristic three.
Figure 6B:
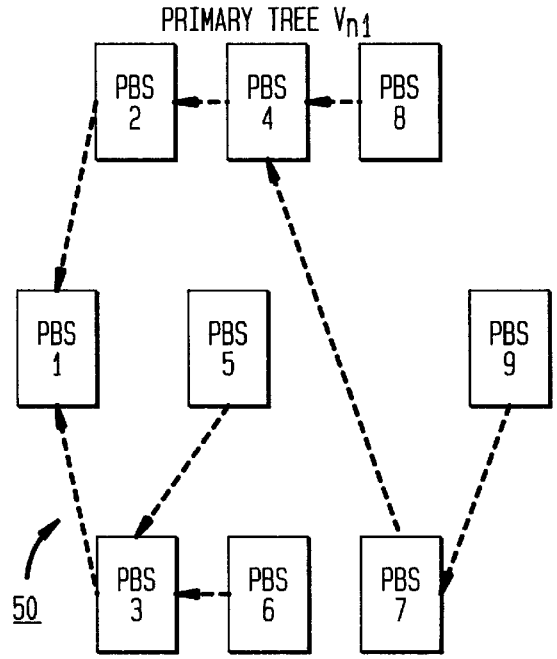
Figure 6C:
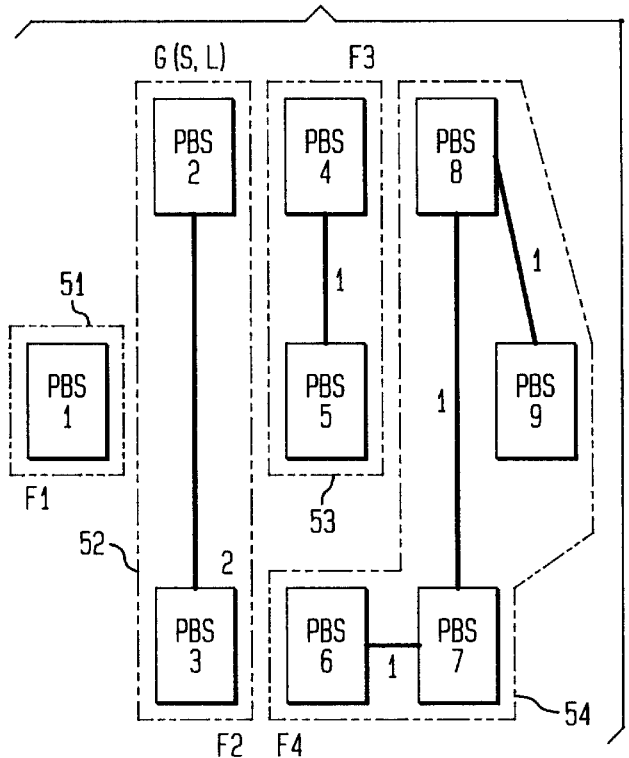

For Heuristic Three, the following procedure is repeated for each PBS n in the network. Step 1 and Step 2 in Heuristic Three are the same as steps 1 and 2 in Heuristic Two. In step 3, a graph G'(S,L–$E_n$) is created by eliminating from G(S,L) the edges that are included in the primary sink tree rooted at node n. Thus, the resulting graph G'(S,L–$E_n$) may be disconnected. Each connected component of G'(S,L–$E_n$) is replaced by a new node, thus creating an auxiliary graph G"(S', E'). In the graph G"(S', E'), mark each edge e with a two-tuple (i,j) denoting the nodes in G(S,L) that this edge represents. For the example network 30 shown in FIG. 6, four disconnected components 51, 52, 53,54 are created as shown in FIG. 6B. FIG. 6A shows the primary tree $V_{n1}$50. There are two edges interconnecting nodes F1 and F2 in graph G"(S', E') 55 in FIG. 6C, marked (2,1) and (3,1) representing the two links in G(S,L) that interconnect the two disconnected components. For each edge (e∈E') assign weight $w_{ij}$ corresponding to the updated weight computed for edge $e_{ij}$ in graph G(S,L) in the second step. Thus, for example, the link (2,1) from node F2 to F1 in G"(S', E') is assigned weight 6.

Figure 6D:
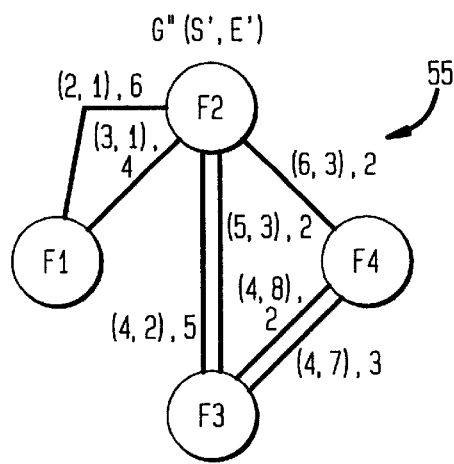

In step 4, run the shortest-paths algorithm for the auxiliary graph, G"(S', E') for the destination node n' such that the connected component labeled n' includes the node n. Name the new tree $V_n$, as shown in FIG. 6D, for example.

Figure 6E:
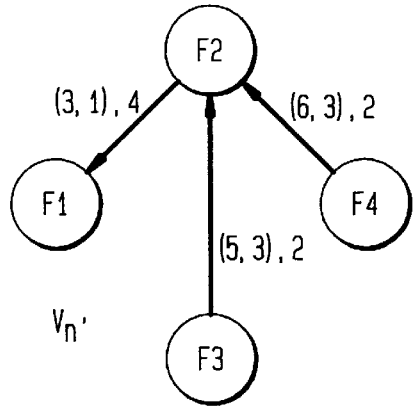
Figure 6F:
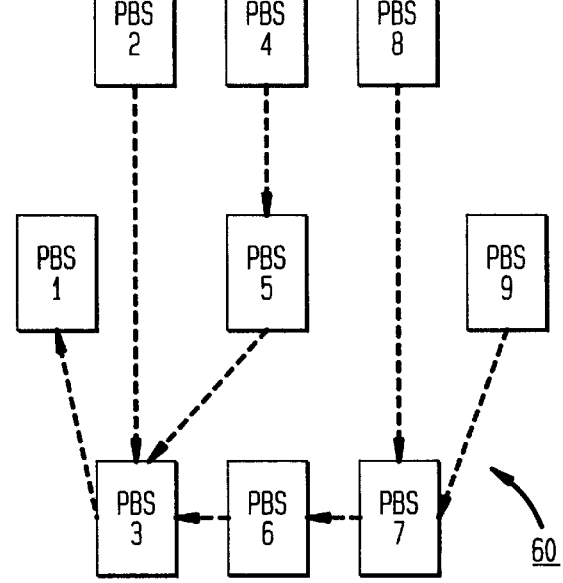

When reaching Step 5, in the tree $V_n$ the nodes n' are expanded and the shortest-paths algorithm for the destination node n is run. FIG. 6E shows the resulting secondary tree $V_{n2}$60. Clearly, this tree is maximally disjoint from the primary tree since it uses links already in the primary tree only when it is completely unavoidable.

Note that the initial VPI trees created by these heuristics are global trees in that they include all the nodes in the network. While handling changing network and traffic conditions, the dynamic VTRP scheme has the option to drop a node from a tree, as will be described. This will create partial trees.

Virtual Trees Routing Protocol (VTRP)

The present invention details procedures to automatically update the routing of the virtual trees which are triggered, for example, by the occurrence of any one of the following events: a physical link in the network becomes congested; a physical link fails; a node (PBS) failed or is removed from the system; a physical link is added to the system; and a PBS is added to the system.

Table 2 lists a notation used in this section to describe the automatic update procedure. As would be understood, a number of VTRP messages are exchanged between PBSs while handling each of the above cases. The mechanism by which these messages are transported is a detail that can be ignored for the purposes of the present invention, under the assumption that most messages are sent on reserved "management" channels on VPIs rooted at the message destination node. Messages that are broadcast are sent on reserved broadcast management channels, all of which would be understood by a person skilled in the art.

Congested Link

Many user-plane procedures have been defined to deal with congestion. These include cell tagging/dropping, rate control, etc. However, in a network in which routes are precomputed as in the exemplary ATM-based wireless network, changes in call arrival/departure patterns and/or user movements may lead to situations in which the precomputed routes can no longer support the incoming traffic. These situations can be observed by detecting consistent congestion patterns. Clearly, in such cases, a management-plane procedure to reroute the VPI trees is needed to prevent repeated congestion. The present invention does not focus on the procedures that detect consistent congestion patterns. Instead, the focus is on a procedure for updating the routes of VPI trees, given that a consistent congestion pattern is detected. However, an example of how a consistent congestion pattern may be detected will be outlined later herein.

Consider that a consistent congestion pattern is observed on link ($p_{im}$,$p_{jm}$) in the direction from $P_{im}$ to $P_{jm'}$. Node i detects the congestion and initiates a four phase procedure. In the first phase, the node that detects congestion, PBS i selects candidate VPIs for rerouting. In the second phase, PBS i initiates several route explorations through its neighbors for each candidate VPI. The "best" route is selected to reroute each such VPI. However, under some circumstances, one or more of these redirections may fail. In such cases, if node i determines that a sufficient number of reroutes have not been accomplished, it initiates a third phase to take further actions. These include node i requesting the "inactivation" of selected VPIs to prevent new connections from being admitted on these VPIs, or deleting itself from a set of VPI trees. The latter action will require a chain of redirections to be performed by downstream nodes. A fourth phase is needed to add a PBS to a VPI tree. This phase is required to keep alive the deletion option of phase III. In other words, since we require that a PBS be located on at least two VPIs to every destination for reliability reasons, if there is no counterpart addition procedure, a PBS will reach a point at which it can no longer exercise the deletion option.

The four phases discussed above are now described in greater detail. The goal of this Phase I is to determine a set of candidate VPIs for redirection. First, node i creates the set $V_{pim}$ of all the VPIs that use the congested link. PBS i needs to select a subset of VPIs from the set $V_{pim}$ for redirection. For example, in the network configuration 70 of FIG. 7, it is assumed that link ($p_1$, $P_{31}$) experiences a consistent congestion pattern in the direction from $p_{11}$ to $p_{31}$. Node 1 detects this condition and determines a suitable candidate set of VPIs for redirection.

Redirecting a VPI that carries live data on assigned VCIs while maintaining ATM cell sequence is a complex process. Hence, redirecting such VPIs is avoided and an approach is adopted in which only empty VPIs are redirected. An empty VPI is one that does not have any assigned VCIs (existing connections). As mentioned above, the goal of this redirection procedure is not to minimize immediately-observed congestion (which is typically handled by user-plane procedures), but rather to minimize the probability of congestion by observing data over long periods of time. Thus, while an empty VPI currently does not carry traffic, its redirection will help by minimizing the number of VPIs on the congested link, and hence future congestion. If there are no empty VPIs in the set $V_{pim}$ then a procedure to gracefully "empty-out" VPIs before redirection is described later in Phase III. In some cases, the network may be required to start such procedures for non-empty VPIs even if there are one or more empty VPIs that are redirected.

The ensuing discussion addresses how a PBS determines which of its VPIs traversing the congested link are empty. In the exemplary ATM wireless network, two types of connection setup procedures are supported: setup of best-effort connections that do not require QoS guarantees, and the setup of connections that require QoS guarantees. The former procedure involves a simple end-to-end handshake between the two end (Local) PBSs with no involvement of transit PBSs. The latter type of setup further involves a node-by-node procedure to check for the availability of resources to meet the specified QoS parameters. Thus, a transit PBS has no knowledge of best-effort connections, but it does have a record of connections admitted with QoS guarantees. A transit PBS can use this information to immediately rule out "non-empty" VPIs. However, to ascertain that a VPI is empty, PBS i needs to communicate with the root of the VPI to ensure that no best-effort connections currently exist on this VPI. It does so by sending a redirect-permission-request message to the root 1 of each VPI $V_{in}$, that may be potentially empty.

If root PBS 1 verifies that a VPI tree $V_{in}$ is empty, it broadcasts a freeze message notifying all PBSs of the redirection. As a parameter of this message, it includes the identifier of the node that is granted permission to perform the redirection. Upon receiving this broadcast message, all the nodes that have an entry for VPI $V_{in}$ (including node i) will place this VPI in a "freeze" state. Based on the permissions granted, node i creates a set $V^e_{pim} \subset V_{pim}$ as the candidate set of VPIs for redirection. If the set ($V^e_{pim} = \phi$), the null set, then node i skips phase II and proceeds directly to phase III.

Figure 7A:
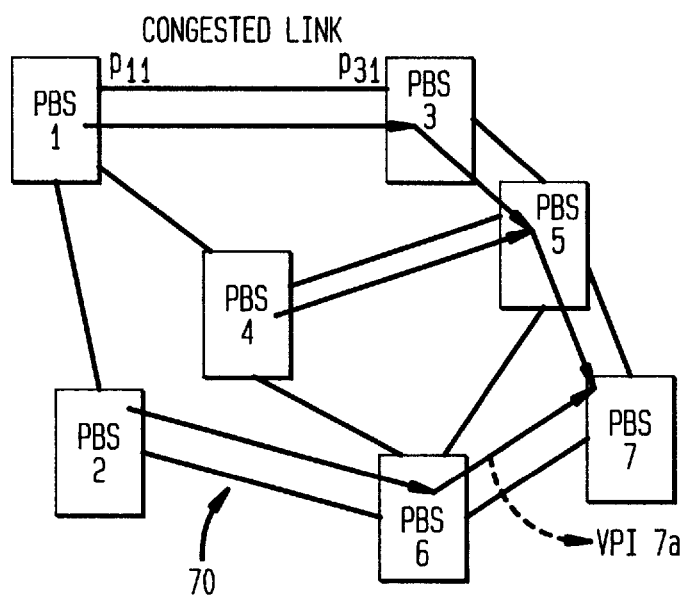
FIGS. 7A and 7B show an exemplary network to illustrate the VTRP procedures of the present invention for Phase I after detection of a congested link.
Figure 7B:
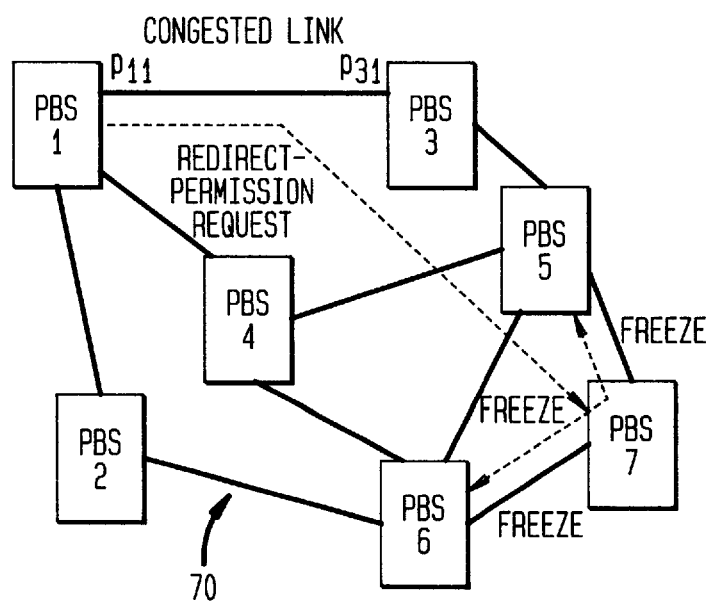

In the example shown in FIG. 7A, VPI 7a rooted at PBS 7 is shown to pass through link ($p_{11}$, $p_{31}$) in the direction from $p_{11}$ to $p_{31}$. Assuming that VPI 7a is potentially empty (in that it has no connections admitted with QoS guarantees), PBS 1 sends a redirect-permission-request to root PBS 7 as shown in FIG. 7B. Similar messages are sent to the root PBS of each such VPI that is routed on link ($p_{11}$, $p_{31}$) in the direction from $p_{11}$ to $p_{31}$. Assuming that VPI 7a is empty, PBS 7 sends a broadcast Freeze message to all the PBSs as shown in FIG. 7.

Having determined the candidate set of VPIs $V^e_{pim}$ for redirection in Phase I, the goal of Phase II is to perform the redirections. For each VPI $V_{in}$, in $V^e_{pim}$, node i sends an explore-route message to all its adjacent nodes (k∈$A_i$), (k≠l), (k ≠j) asking if the node is able to accommodate a redirection of the VPI $V_{in}$. In the exemplary network 70, this message is sent to nodes 2 and 4 (see FIG. 8).

Upon reception of these requests, each node checks its Transit VPIs data table T1 to determine if it has an entry for the VPI in question. If it does not have an entry, it sends a refusal message to i. If it has an entry, it initiates a Check-Resources-and-Cycles process to determine if the path $r_{kl,n}$ has sufficient resources on the links along the path to permit this redirection, and to ensure that no cycles are caused in the tree structure of the VPI $V_{In}$.

In the Check-Resources-and-Cycles Process, Node k reads its Transit VPIs data table $T_1$ to determine the port identifier $p_{km}$ corresponding to VPI $V_{in}$. Then, it checks the entry for the port in the Port/capacity data table $T_2$ to determine the spare capacity on the link attached to this port. It also checks for cycles by consulting the Port/capacity data table to determine whether the neighboring PBS on port $p_{km}$ denoted N($p_{km}$) is PBS i.

If there is no spare capacity on the link, the redirection along that path is not possible. Similarly, if node k determines (N($p_{km}$)=i ) then redirection is not possible because a circuit or a loop is created, and the tree structure destroyed. In both these cases, node k stops the redirection, and sends a redirection-reject message directly to the root node l.

On the other hand, if (N($p_{km}$)≠i ) and if there is spare capacity on the outgoing link that the VPI in question uses, the capacity field of the explore-route message is tagged with the minimum of its current value and the value of the spare capacity on this outgoing link. The explore-route message is then sent to the next node along the route $r_{kl,n}$.

Figure 8:
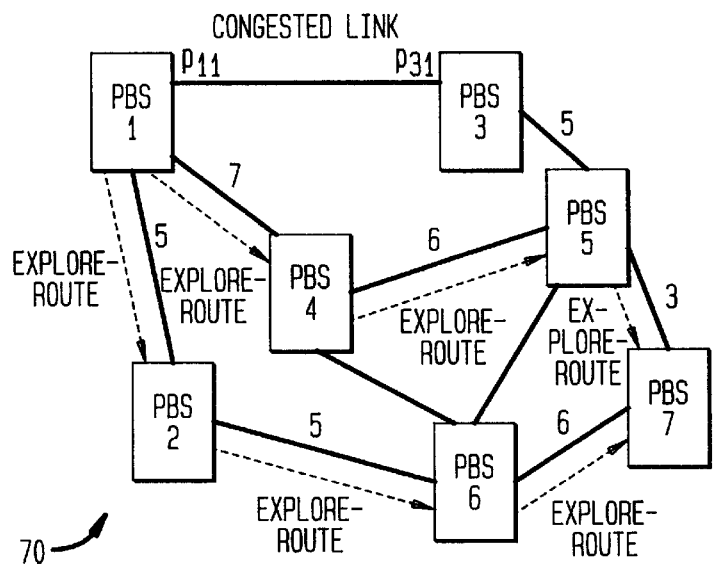
FIG. 8 shows an exemplary network for illustrating Phase II redirection procedures according to the present invention.
Figure 9:
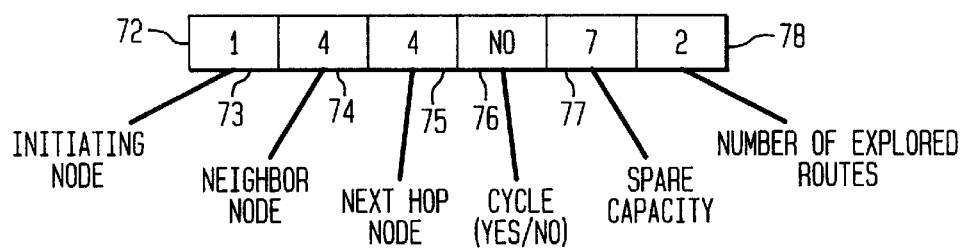
FIG. 9 shows one exemplary embodiment of an explore-route message according to the present invention.

In the example network 70, the spare capacities on relevant links are shown in FIG. 8. Given that both neighbors 2 and 4 are on the VPI tree being redirected (VPI 7a), they respond by performing the Check-resources-and-Cycles process. The explore-route message 72 sent from node 1 to node 4 is shown in FIG. 9, which also explains the fields of the message. As can be seen, the explore-route message contains various fields, including the initiating node 73, neighbor node 74, next hop node 75, cycle 76, spare capacity 77 and number of explored routes 78 fields. Other measures of resource availability, hop count, etc. may also be included as parameters in this message, as would be understood by a person skilled in the art. Upon completing the Check-Resources-and-Cycles procedure, it sends the explore-route message to the next node (5). This message has the parameters 1, 4, 5, no, 6, 2 corresponding to the 6 fields of the message shown in FIG. 9. Note that the spare capacity is replaced by the smaller of the current value (7) and the spare capacity in the outgoing link to node 5 (6).

Each node along the route $r_{kl,n}$ that receives the explore-route message will perform the Check-Resources-and-Cycles procedure. If successful, this route exploration proceeds node-by-node until the root PBS 1 is reached. At any point along this exploration, if the Check-Resources-and-Cycles procedure fails, the corresponding PBS sends the redirection-reject message directly to the root PBS.

For each route $r_{kl,n}$ explored, the root PBS I will receive an explore-route message or a redirection-reject message. The node 1 selects one of these routes $r_{kl,n}$ through which redirection is possible. Details regarding how node 1 makes this selection are described later herein. In the simple case shown above, where only spare capacity is part of the explore-route message, the root selects the path that has the most spare capacity. The root PBS l then sends a message to node i with the identifier of the neighbor PBS k through which the VPI $V_{in}$ must be redirected. If there is no neighbor that can accommodate the redirection, the node l sends a message to PBS i indicating that redirection of the VPI is not possible.

Figure 10:
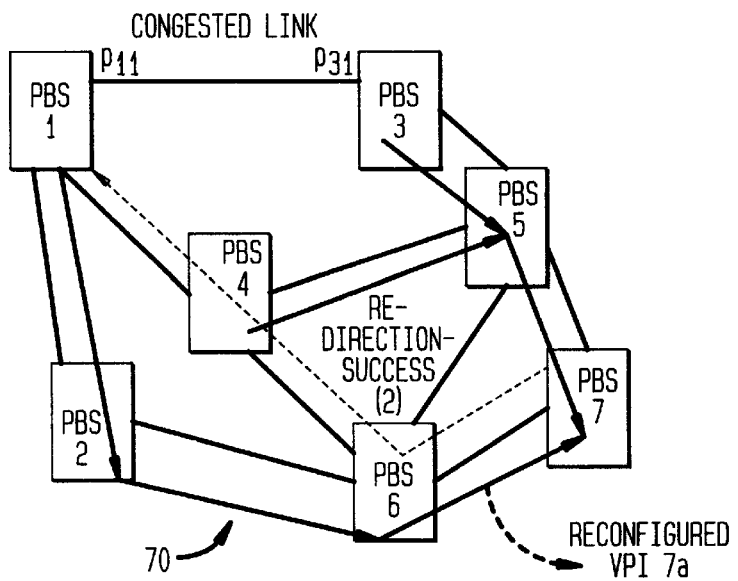
FIG. 10 shows an exemplary network for illustrating Phase II redirection procedures according to the present invention.

If node i receives a redirection-success message from PBS l specifying the identifier of the neighbor k through which the VPI $V_{in}$ must be redirected, node i changes the port identifier for $V_{in}$ in its Transit VPIs data table $T_1$ to indicate the port leading to its neighbor. For example in the exemplary network 70, as shown in FIG. 10, PBS 7 sends the redirection-success message to node 1 identifying 2 as the node through which VPI 7a must be redirected. It chooses PBS 2 instead of PBS 4, since the spare capacity on the path via node 2 is 5, while it is 3 for the path through neighbor 4. PBS 1 changes its Transit VPIs data table $T_1$ and the reconfigured VPI 7a is as shown in FIG. 10.

When node i completes this update in Transit VPIs data table $T_1$ it sends a message to the root PBS l. Upon reception of the message, the root PBS checks if there are other queued requests for redirection on that VPI tree. If there are pending requests, root l gives permission for redirection to the next request in the queue. It then broadcasts a freeze message to all nodes informing them of the new redirection. If there are no more redirection requests in the root PBS 1, then I sends a broadcast message to all PBSs that the redirection operations on the VPI tree have been completed. Upon reception of this message, each PBS that has an entry for VPI $V_{in}$, will return the status of this VPI to "active".

On the other-hand, if node i receives a redirection-failure message, it makes no changes to its Transit VPIs data table $T_1$. It must then determine whether a sufficient number of other VPI redirections succeeded to alleviate the repeated congestion pattern observed. If not, it initiates Phase III of the algorithm.

Phase III is entered if one of the following two cases occurs: $V^e_{pim}$ is empty, i.e., all VPIs in the set $V_{pim}$ have active connections, or the number of successful redirections of the VPIs in the set $V^e_{pim}$ is not sufficient to alleviate the repeated congestion pattern (a redirection may fail due to lack of spare capacity or the formation of cycles).

In the first case ($V^e_{pim}$ is empty), node i arranges the VPIs in the set $V_{pim}$ in the ascending order of N, where N is the number of active connections on each VPI. It then selects the first M VPIs from this set as candidates for redirection. For each VPI $V_{in}$ in this set, it sends a message to the root PBS l to inactivate the VPI $V_{in}$ which prevents it from admitting new connections on this VPI. This allows the VPI $V_n$ to gracefully "empty-out" as connections get released. In addition, the root l sends a broadcast message to all PBSs notifying them of the "inactivated" state of the VPI tree $V_{in}$. When all existing connections (VCIs) on VPI $V_{in}$ terminate, the VPI is empty. Root l grants permission for redirection to the node that requested the original inactivation.

In the second case (many of the redirections fail), node i chooses to delete itself from a number of the VPIs in set $V_{pim}$. This option of deleting PBS i from a VPI tree helps reduce traffic on the VPI tree by eliminating data generated by mobiles located on this PBS. For reliability purposes, it is required that each PBS be on at least two VPI trees that terminate at every other PBS in the network. If node i determines (by consulting its PBS-to-VPIs mapping table $T_4$) that is located on at least two other VPI trees terminating at the root PBS l, it can delete itself from the VPI tree $V_{in}$. It starts the deletion process by sending a message to the root l asking for permission to delete itself from the tree.

PBS l temporarily freezes the VPI $V_{in}$, thus preventing new connections from being admitted until the deletion is completed. In addition, it broadcasts a message to all the PBSs informing them that the VPI in question is in a "freeze" state due to a deletion operation being executed on it.

Figure 11A:
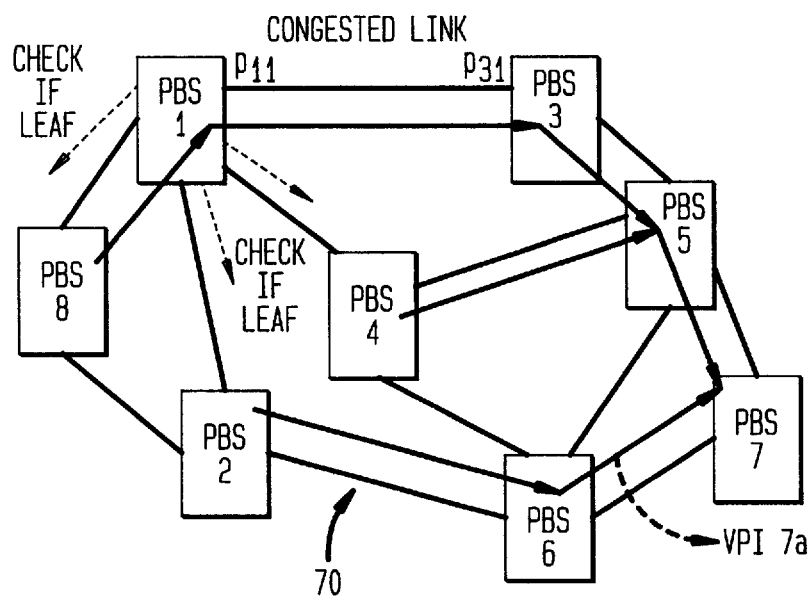
FIGS. 11A and 11B show an exemplary network for illustrating Phase III deletion procedures according to the present invention.

If granted permission to delete itself, PBS i must determine whether it is a leaf node on this tree or a transit node. In the latter case, downstream nodes will be sending data through PBS i on this tree, and hence it cannot simply delete itself without first having these nodes redirect the VPI tree to pass through some other node. PBS i determines whether it is a leaf node or not by sending a message to each of its adjacent nodes ($k \in A_i$, $k \ne j$). For the example network 70, if it is assumed that both redirection attempts through nodes 2 or 4 failed, then node 1 may try this option of deleting itself from the VPI tree 7a. It does so by sending a check-if-leaf message to its neighbor nodes, 8, 2, and 4, as shown in FIG. 11A (for purposes of illustrating this phase, we added a new node PBS 8 to the original example network shown in FIG. 10).

If the responses from the neighbors indicate that no node uses PBS i to route cells with the VPI $V_{in}$, it means that i is a leaf node in the VPI tree. In this case, PBS i eliminates the entry that corresponds to VPI $V_{in}$ from its VPI Transit VPIs data table and updates the PBS-to-VPIs-mapping table $T_4$. It sends a message to the root l notifying it of the completion of the deletion. PBS l eliminates i from the list of nodes that are included for $V_{in}$ in its Destination VPIs Table $T_3$ and re-enables the VPI $V_{in}$.

Figure 11B:
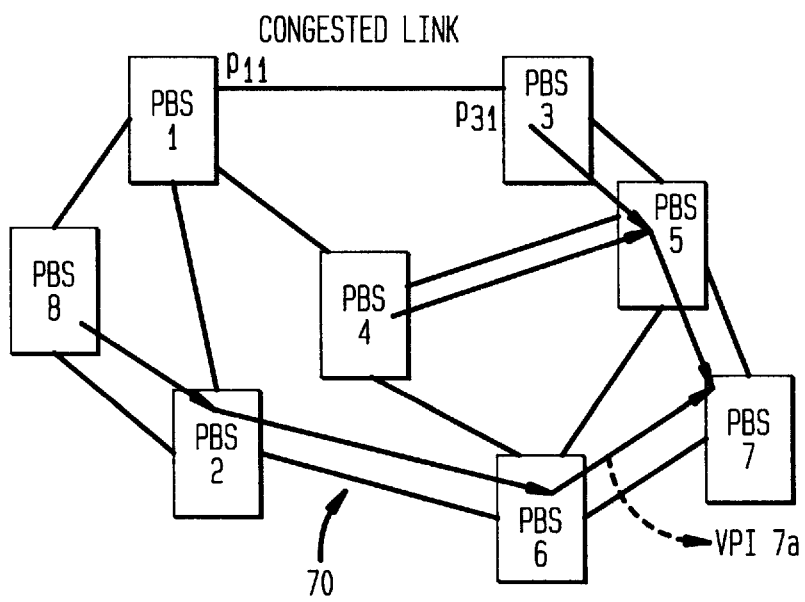

On the other hand, if responses from neighbors indicate that PBS i is used to route cells with the VPI $V_{in}$ for some of the neighboring PBSs, then PBS i asks each such neighbor to redirect the VPI $V_{in}$ without using i. Referring to FIG. 11A, since only node 8 is downstream of PBS 1 for the VPI tree 7a, it will need to first redirect VPI 7a, before node 1 can delete itself from the tree. If all such neighbors successfully complete the redirection and notify node i, i eliminates the entry for VPI $V_{in}$ from its Transit VPIs data table and sends a message to the root l as before. In the example network, as shown in FIG. 11 A, after node 8 redirects VPI 7a (through node 2 instead of node I), PBS 1 deletes itself from the VPI tree 7a.

If even one of the redirections of the downstream nodes fails, node i cannot delete itself, and must try other VPI trees for redirection/deletion. Note that the deletion option is only allowed if trees are allowed to be partial instead of global, which is one of our assumptions regarding the VPI trees as stated previously.

In Phase IV, as mentioned in Phase III, a PBS i is able to delete itself from a VPI tree $V_{in}$ only if it has two other available VPIs rooted at l. If after a deletion procedure, PBS i has only two active VPIs $V_{im}$ and $V_{lp}$ to a destination node l then it must initiate the addition procedure when a time period τ expires. Given that multiple (>2) VPI trees, are rooted at PBS 1 it is likely that some of the neighbors of PBS i may be located on other VPIs, ($V_{lq}$, q≠m, p). PBS i obtains this information by sending a message to each of its neighbors. If a neighbor k responds indicating that it is located on a VPI ($V_{lq}$, q≠m, p) then node i simply joins this tree as a leaf node. It does so by making an entry in its Transit VPIs data table $T_1$ mapping $V_{li}$ to the port leading to neighbor k. Using this procedure node i can join a number of VPI trees leading to destination l.

If none of the neighbors are located on a VPI ($V_{lq}$, q≠m, p) then this phase terminates, and node i will attempt this addition procedure after a random amount of time.

Physical Link Failure

For the VTRP procedure for handling a link failure, assume that a physical link ($p_{inv}$, $P_{jm'}$) between PBSs i and j fails. All existing connections on the link are dropped. Thus, all the VPIs that traverse the failed link are empty (as defined previously). Both nodes i and j detect the link failure and take the necessary action to alleviate the damage that the failure event could cause in the network. The actions that PBS i takes upon detection of this link failure are now described. As would be understood, similar actions are taken at PBS j.

First, PBS i creates the sets $V^l_{pim}$ of VPI trees that use the failed link for each destination l. If there are more than two functional VPIs to a destination node l, node i does not attempt to redirect the VPIs in the set $V^l_{pim}$. Instead, it merely performs a selective freeze of the VPIs at nodes downstream from itself. This prevents any of these nodes from sending cells with a VPI in the set to node i since these cells will be dropped. This temporary measure is taken based on the assumption that the failed link will be restored soon allowing for the reactivation of these VPIs. This selective freeze procedure is described below as Case 1. On the other hand, if node i has two or fewer functional VPIs to a node l after the link failure, then it redirects some of these VPIs in the set $V^l_{pim}$ in order to have multiple routes to destination node l for load-balancing and reliability reasons. This procedure is described below as Case 2. The decision on whether to execute Case 1 or Case 2 is made for each destination node l.

Figure 12:
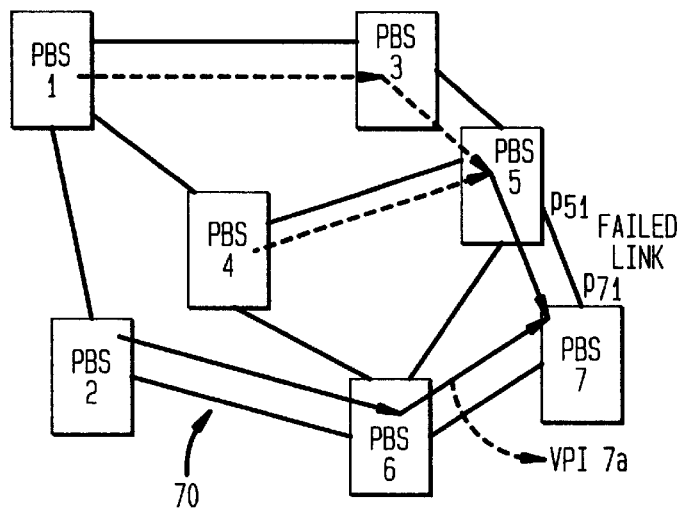
FIGS. 12 and 12A show an exemplary network for illustrating selective freeze procedures according to the present invention.
Figure 12A:
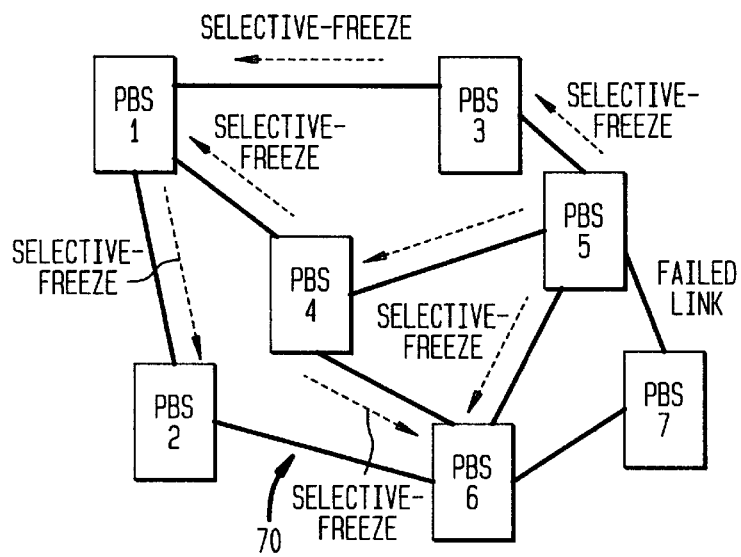

Case 1: In the exemplary network 70 shown in FIG. 12, VPI 7a rooted at PBS 7 is shown to pass through the link ($p_{51}$, $p_{71}$). To illustrate case 1, it is assumed that link ($p_{51}$, $p_{71}$) fails, and PBS 5 has more than two VPIs to destination node 7 that do not traverse this failed link. Thus, PBS 5 performs the selective freeze operation on VPI7a. In general, the node that detects the failure, PBS needs to perform this selective freeze operation for all VPIs ($V_{lq} \in V^l_{pim}$). Unlike, the freeze VPI operation described previously, a selective freeze on $V_{lq}$ deactivates the VPI at only downstream nodes on the paths that pass through i. Since root l does not have the whole tree structure for $V_{lq}$ and hence does not know which nodes are downstream from i, the selective freeze cannot be performed using a broadcast message from as in the case of the freeze VPI operation. The only way to perform a selective freeze is to propagate messages backwards from l to all downstream nodes on the paths that pass through i.

First, PBS i updates its own Transit VPIs data table $T_1$ (see Table 1) to indicate that VPI $V_{lq}$ is temporarily deactivated. Then, PBS i sends a selective-freeze message to each of its adjacent nodes $k \in A_i$ to request the temporary inactivation of $V_{lq}$. Node k consults its Transit VPIs data table $T_1$ to determine if it is located on VPI $V_{lq}$. If it is, then it further determines whether the output port corresponding to VPI $V_{lq}$ (determined from Transit VPIs data table $T_1$) is physically connected to PBS i (determined from Port/capacity data table $T_2$). If this is also true, then node k updates its Transit VPIs data table $T_1$ to indicate inactivation of VPI $V_{lq}$. It also records the identifier of the node that initiated the selective freeze operation (this is needed to handle the case of multiple selective freezes on the same VPI). It then forwards the selective-freeze message to all its neighbors except PBS i. Each neighbor m of k performs a similar set of functions, except that node m will test to see whether is uses node through which to route cells with VPI $V_{lq}$ rather than node i. This chain reaction propagates through the network.

If VPI $V_{lq}$ does not pass through node k or even if it does, and node k is not an input neighbor to node i for this VPI, then node k stops the selective-freeze message from further propagation. This may happen anywhere down the chain of message propagations.

Finally, every PBS k that selectively inactivates $V_{lq}$ informs the root, node l of this action using a VPI-inactive-notify message. This allows the root PBS to update its Destination-VPIs table $T_3$. This operation is important, since during connection admission, the root PBS selects the VPI tree incoming to itself on which the connection must be admitted, and hence needs to have an updated table $T_3$.

Figure 2:
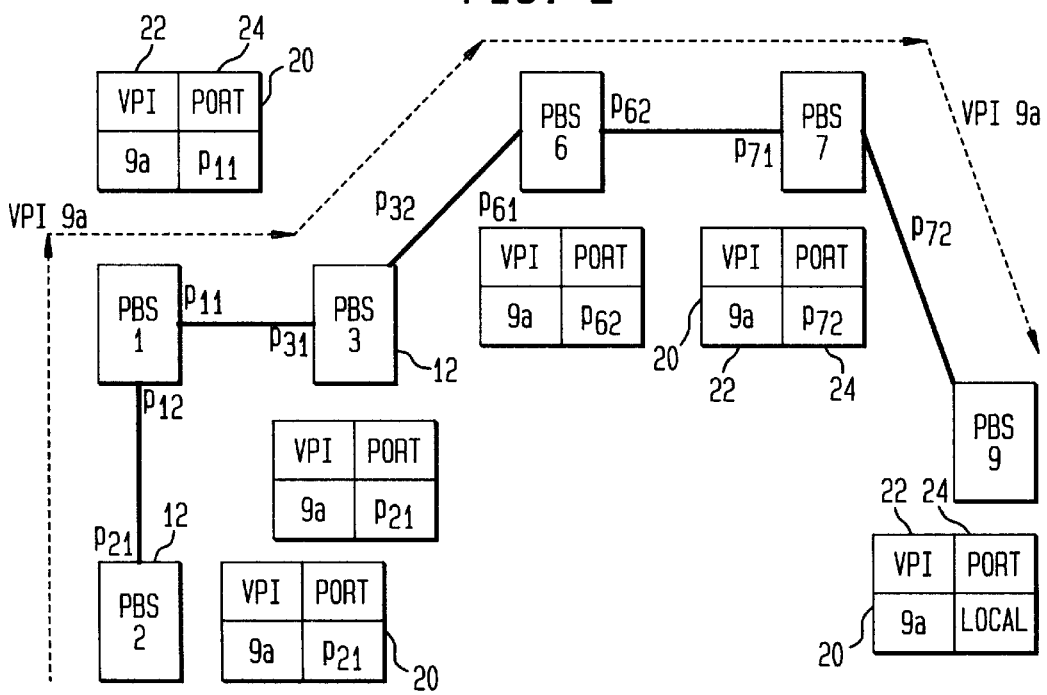
FIG. 2 shows the use of Transit VPIs data tables $T_1$ for VPI 9a in the exemplary ATM wireless network.

In the exemplary network 70 shown in FIG. 1 2A, PBS 5 sends a selective-freeze message to its neighbors, PBSs 4, 3 and 6. While PBS 6 is located on VPI 7a, it is not an input neighbor to PBS 5 for this VPI. Hence, it stops the propagation of the message. PBSs 3 and 4 are input nodes to PBS 5 on VPI7a. So they inactivate VPI7a in their $T_1$ tables and forward the selective-freeze message to their neighbors. PBS 3 will forward a selective-freeze message to PBS 1 and PBS 4 to PBSs 1 and 6. PBSs 1 and 6 will ignore the messages from PBS 4 since they are not input nodes for PBS 4 on VPI7a. But PBS 1 will freeze VPI7a upon reception of the message from PBS 3, and forward it to its neighbor PBS 2. which ignores this message since node 2 does not use PBS 1 to route cells with VPI 7a. PBSs 1, 3, 4 and 5 send VPI-inactive-notify messages to the root PBS 7 (not shown in FIG. 12 for clarity reasons). The paths of VPI7a that are not functional after the termination of the selective-freeze operation are show in FIG. 12 with dashed lines.

Case 2: As explained earlier, this case is selected if less than two functional VPIs remain to a destination node l after the link failure. Node i attempts to redirect the VPIs ($V_{lq} \in V^l_{pim}$). The redirection is performed as described earlier. Each redirection may succeed or fail. If there are sufficient successful redirections such that the resulting number of functional VPIs to destination node l is greater than two, then PBS i can simply selectively freeze (as described in Case 1) any VPIs $V_{lq} \in V_{pim}$ that could not be redirected. However, if the resulting number of functional VPIs to l after the redirections is two or fewer, then node i adds itself to other VPIs to destination l using the procedure described in Phase IV above. In addition, PBS i initiates a selective freeze operation, as in Case 1, for each VPI $V_{lq} \in V_{pim}$ that was not successfully redirected.

PBS Failure

A PBS failure is treated as being equivalent to the failure of all the physical links attached to this PBS. Thus, it is handled as a multiple physical link failure scenario. For each of the links attached to the failed PBS, the neighbor nodes initiate recovery procedures as described with respect to link failure.

Addition of a Link

This section describes the VTRP procedure to incorporate a newly-added link ($P_{in}, P_{jm'}$) between PBSs i and j. The new link can be either a replacement for a failed link, or a new link added between two ports for network growth. The present invention VTRP procedure treats these two cases differently, as described below.

Case 1: For Case 1, the added link replaces a previously failed link ($p_{in}, p_{jm'}$) In this case, PBS i finds the VPIs $V_{lq} \in V_{pim}$, that were inactivated by the selective freeze procedure when the link failure occurred. For each such VPI, PBS i updates its own Transit VPIs data table $T_1$ to indicate that VPI $V_{lq}$ is back to its active state, and sends a selective-unfreeze message to all its neighbors ($k \in A_i$). Each neighbor k performs similar steps as described in link failure case to send this message in a chained-fashion downstream, while reactivating the VPI $V_{lq}$ by updating its Transit VPIs data table $T_1$. Each node also informs the root PBS l of this reactivation. The root PBS accordingly updates its Destination-VPIs data table $T_3$ and the restored link is thus incorporated into the network.

Case 2: With Case 2, if a new link is added between two ports that were previously not connected, then the task of incorporating the new link into the network is more challenging. In order to utilize the link, both nodes i and j redirect some of their VPIs on to the new link. The procedure for the redirections at node i is described. A similar procedure is executed at node j.

Figure 13:
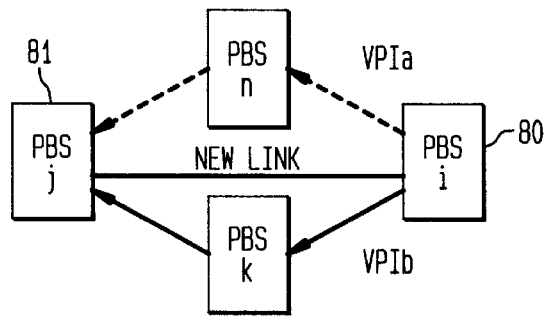
FIG. 13 illustrates the addition of a link in an exemplary network.

A simple case of reconfiguration occurs if there are other links already in existence between nodes i and j. In this case, PBS i identifies a set of empty VPIs that traverse these parallel links, and switches some of them over to the new link. In case there are no such parallel links, node i needs to select a set of empty VPIs that pass through other links and redirect them on to the new link. The redirection procedure described previously can be used. Ideally, as shown in FIG. 13, VPIs, such as a and b that pass through nodes i (80) and j (81) should be redirected, since this reduces the hop counts on these VPI trees. These VPIs can be identified using messaging "up-stream" just as "downstream" messaging was used for the selective freeze operation in the link failure procedure. Also, as links congest, the VTRP procedure will route more trees through this new link, thus incorporating it into the network.

Addition of a PBS

The VTRP procedure of the present invention to incorporate a newly-added node, PBS i, into the network is the most complex reconfiguration operation. The addition of a PBS requires two phases. In Phase I, the VPI trees that node i should join in order to reach every other node in the network are determined. As per the reliability constraint, node i must join at least two VPI trees rooted at each destination node 1. In Phase II, the VPI sink trees rooted at node i are created, thus providing connectivity from all other nodes in the network to PBS i.

Phase I: I Phase I, PBS i has a set of adjacent nodes $A_i$. It starts by asking each neighbor $k \in A_i$ for the list of VPIs that node k is located on. Each neighbor k consults its PBS-to-VPIs mapping data table $T_4$, which maps PBS IDs to VPIs, and sends a reply message back to node i with this list. If a VPI to a given destination node I is reachable through only one neighbor k', then node i simply attaches itself to this VPI tree through node k' by setting an entry for this destination and VPI in its data tables $T_4$ and $T_1$. After receiving the replies from all the neighbors and joining as many VPI trees as possible, node i determines whether it meets the reliability and load-balancing criteria of being located on multiple (two or more) VPI trees to every destination. If it is, then this phase of the node addition procedure is complete. If not, then PBS i must select one or more of the VPI trees that are reachable through multiple neighbors.

For each such VPI $V_{lm}$ rooted at destination I a resource-check procedure is performed to select the neighbor k' through which node i should join the VPI tree $V_{lm}$. PBS i sends a message to each neighbor k that is located on $V_{lm}$ asking it to initiate a node-by-node resource check, similar to the one used during redirection in Section. Upon reception of this message, each neighbor k sends a check-resources message node-by-node along the path $r_{kl,m}$. When these messages reach destination node l, it responds to node k specifying the "available resources" on the path $r_{kl,m}$. The results of these resource-checks are passed back to node i allowing it to decide which neighbor to use while joining VPI tree $V_{lm}$.

Figure 14A:
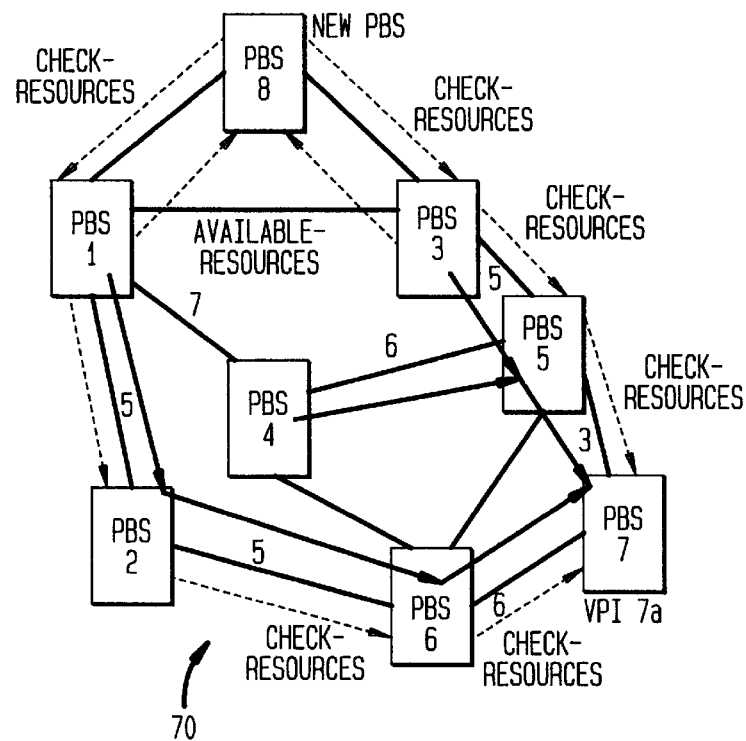
FIGS. 14A and 14B show an exemplary network for illustrating Phase I procedures for addition of a PBS according to the present invention.
Figure 14B:
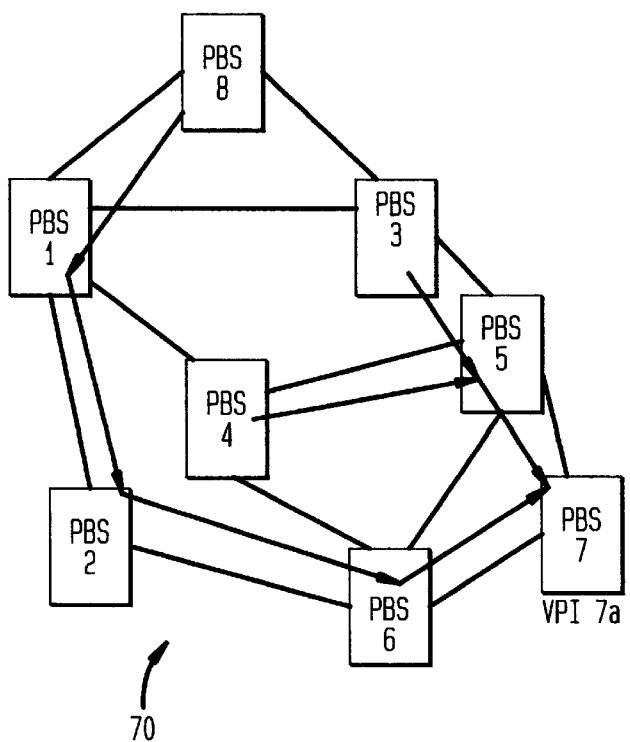

An example of this resource-check procedure while adding a new node PBS 8 to a given network 70, is shown in FIG. 14A. PBS 8 has links to nodes 3 and 1. VPI 7a is reachable through both PBS 3 and PBS 1. Thus, PBS 8 needs to request these resource checks in order to select the neighbor through which it should join the VPI tree 7a. PBS sends a check-resources message to both neighbors, PBS 3 and PBS 1. The available resources on each link along the routes of VPI 7a are shown marked in FIG. 14. The minimum available resources on route $r_{37,a}$ and route $r_{17,a}$ are 3 and 5, respectively. PBSs 1 and 3 acquire this information and reply to PBS 8 with an available-resources message. Since $r_{17,a}$ has more available resources, PBS 8 selects neighbor 1 through which to join the VPI tree 7a. The new structure of VPI 7a is shown in FIG. 14.

Phase II: In Phase II, the VPI sink trees rooted at node i are created. The optimum way to get a VPI sink tree for a node i is to execute a distributed version of the Bellman-Ford algorithm and get the shortest-path tree for PBS i. However, even if this approach is adopted to get the primary sink tree for i, one or more alternative trees still need to be found for reliability and load-balancing purposes. The heuristics described previously for the initial VPI trees computation are centralized. This requires node i to acquire the whole network topology and loading conditions. Since this is cumbersome, a simpler solution (though not a "minimum-cost" one) is described. This is based on simply copying sink trees rooted at the neighbors, thus creating a set of trees rooted at i.

Before presenting the details of this procedure, it is noted that it is important to have an on-line automated mechanism for incorporating the new node into the network without requiring manual administration of data tables at all the nodes in the LAN. A "planned-downtime" for the whole LAN is clearly another option, which would allow the execution of the optimization solver or the heuristics described previously, for a recreation of the "initial trees" for this new topology.

In the proposed solution for an on-line Phase II procedure, each node k adjacent to i has a number of sink trees with k as a root. Node i sends a message to each adjacent node k asking for the n least loaded sink trees rooted at k. Node k consults its Destination-VPIs data table $T_3$ and sends a list of the VPIs $(V_{k1}, V_{k2}, \ldots, V_{kn})$, along with the set of nodes that are located on each of these VPIs.

Upon reception of the information from all adjacent nodes, PBS i selects a set of least loaded trees such that the union of all the nodes that are located on these trees is the set of all nodes in the network. A PBS can make this loading decision by simply determining how many VCIs are currently active on each of its VPIs. This gives a rough measure of the loading of each VPI tree. It also ascertains that each node in the network has at least two paths to reach it.

Figure 15A:
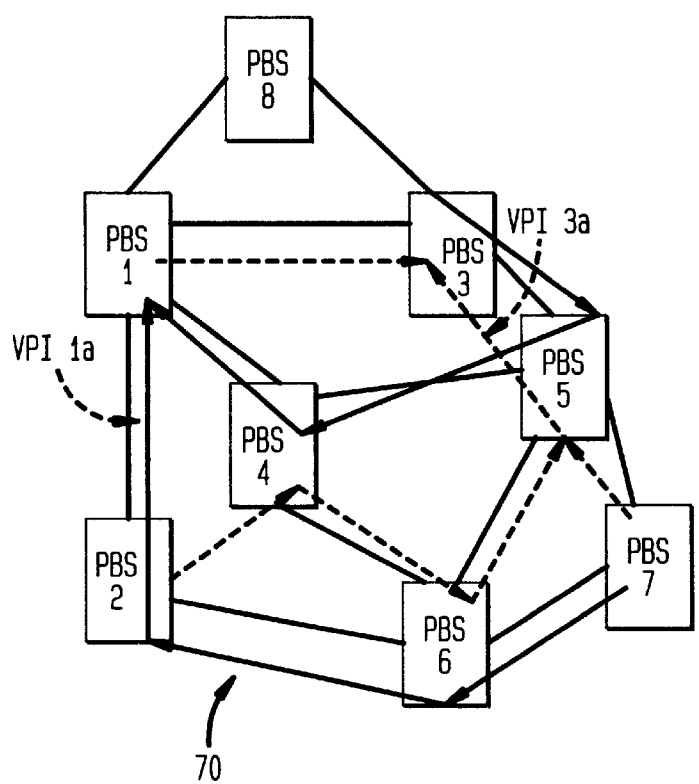
FIGS. 15A and 15B show an exemplary network for illustrating Phase II procedures for addition of a PBS according to the present invention.
Figure 15B:
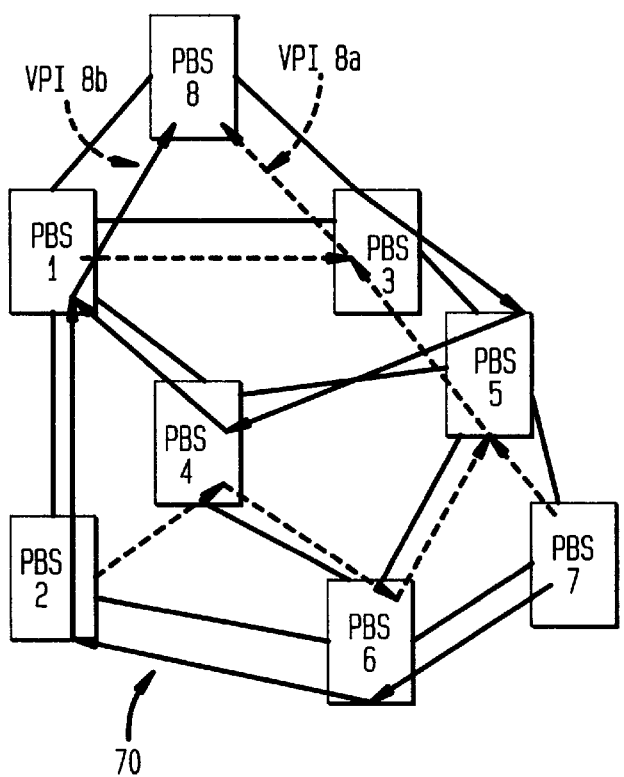

As an example, FIG. 15A shows the network 70 with two VPIs 1a and 3a rooted at nodes 1 and 3, respectively. Both these VPI trees happen to be global. For illustration purposes, assume that these are the most lightly loaded of all the VPI trees on the two PBSs 1 and 3. The new node, PBS 8, obtains this information by communicating with its two neighbors 1 and 3. The second network 80 in FIG. 15B shows that node 8 has created two new trees 8a and 8b by using the same configuration as VPIs 1a and 3a, except for the extensions to itself.

For each tree $V_{in}$ that i creates, it makes a new entry in its Destination-VPIs data table $T_3$. It also broadcasts a message to all the PBSs in the network, as would be understood by a person skilled in the art. The broadcast message has three parameters, its own identifier, i, the identifier of the newly added VPI $V_{in}$ rooted at node i and the identifier of the VPI tree $V_{km}$ rooted at neighbor node k that was copied to create VPI $V_{in}$. When a PBS j other than i, receives the broadcast message, it checks its Transit VPIs data table $T_1$ to see if it has an entry for VPI $V_{km}$. If it does not, it simply ignores the received message. If it does, it creates a new entry for $V_{in}$ in its Transit VPIs data table $T_1$ and copies the port number corresponding to the entry $V_{km}$. Node j also updates its PBS-to-VPIs mapping data table $T_4$ to reflect this new VPI. Thus, all nodes located on these new VPI trees rooted at i are now configured to communicate with the new node i.

Figure 16:
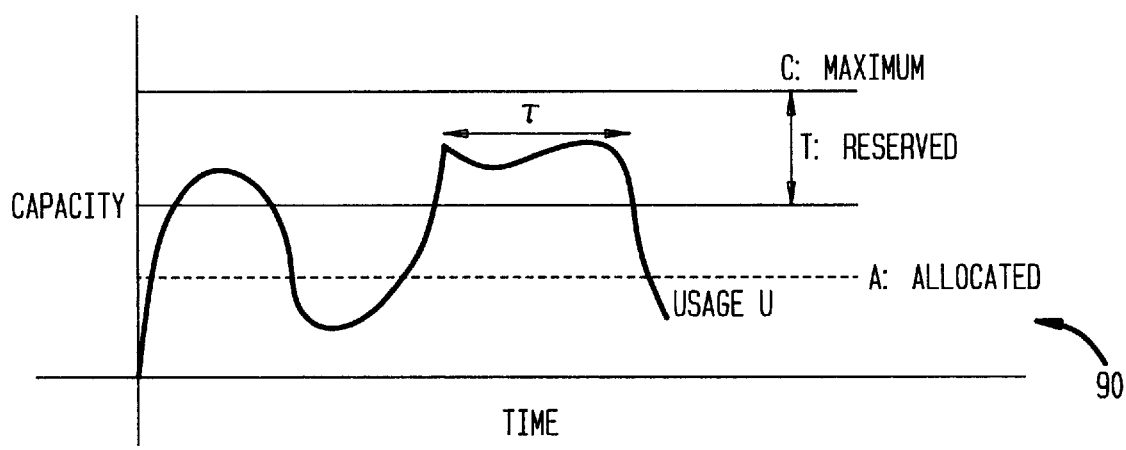
FIG. 16 shows a graph of link capacity vs. time for an exemplary usage curve.

As mentioned previously, it is desirable to describe how consistent congestion patterns, which trigger the four-phase procedure described above, can be detected. As would be understood, many approaches can be used to observe the occurrence of consistent congestion patterns. Any of these can be used in conjunction with the VTMA procedures described. As an example, one approach for consistent congestion pattern detection illustrated in FIG. 16 shows a graph 90 having a certain capacity T reserved to absorb bursts when needed. Capacity C-T represents the maximum that can be allocated to connections assuming that some form of equivalent bandwidth is used to make these allocations. In FIG. 16, the current allocated capacity is shown as A and the current usage as U. If C–U <T for a period of τ, a congestion incident is said to have occurred. If some number K of these congestion incidents occur within a given period γ, a consistent congestion pattern is detected, and the management plane procedure for rerouting VPI trees is initiated.

With respect to a race condition that may occur in Phase I of the procedure described regarding link failure while constructing the set $V^e_{pim}$. It is possible that after a node i sends the redirect-permission-request for a VPI $V_{in}$, another node j may also issue a redirect-permission-request for the same VPI before it receives the broadcast freeze message sent by the root in response to the first request. This race condition requires that it be determined how multiple "simultaneous" redirection requests for the same VPI are handled. The approach is to simply disallow multiple simultaneous redirections on the same VPI. The reason is that multiple concurrent redirections might lead to unpredictable results that destroy the tree structure of the VPI. Thus, between having to check with the root PBS to ensure that a VPI is empty, and requiring coordination of multiple "simultaneous" requests, the root PBS of the VPI being redirected plays an important server-like role in the redirection. After granting permission for one redirection request per VPI, the root PBS I starts placing any further requests in a queue. It serves these requests on a FCFS basis, i.e., following the completion of the first redirection, it grants permission to the node with the next request in the queue. Note that there is no conflict in performing redirections for multiple VPIs simultaneously.

In Phase II, each node performs the Check-Resources-and-Cycles process. This requires the determination of "spare" capacity on the outgoing link for the VPI tree being traced. Different approaches can be used to determine the "spare" capacity. For example, spare capacity on a link S can be defined as C-A-T (see FIG. 16). This gives a measure of how much bandwidth is as yet unallocated to connections. However, a problem with using this measure exclusively is that there may be more best-effort connections (those setup with no QoS guarantees) on a path with a larger value of S than on a path with a smaller value of S. Selecting the path with the larger S in this case may lead to further call blocking and/or congestion. Other schemes, such as having each PBS monitor a time-averaged usage for each of its links could lead to better measures of "spare" capacity. Besides spare capacity, other measures can also be used in selecting one of several routes that are explored for redirection. Examples include hop count (number of transit PBSs on the route) and a measure of "disjointedness". Choosing a route with a fewer number of transit PBSs will lead to an overall improvement in bandwidth utilization. If a node i is located on two VPIs, $V_{in1}$ and $V_{in2}$ leading to a root PBS I maximizing disjointedness of these two paths is essential for reliability considerations. Using this as a basis for route selection during redirection, the root PBS may give more weight in the route selection process to those routes that are more disjoint from existing routes (on other VPIs) from the redirection-initiating PBS to the root. A route from PBS i to root PBS 1 that is "more disjoint" from existing routes on other VPIs also leading to I may be preferred over less disjoint routes. Thus, different measures, such as spare capacity, hop count, disjointedness, etc. may be used in the process of selecting a route for VPI redirection. For each measure, a corresponding parameter may need to be checked at each transit node along the new route.

From the above, it should be understood that the embodiments described, in regard to the drawings, are merely exemplary and that a person skilled in the art may make variations and modifications to the shown embodiments without departing from the spirit and scope of the invention. All such variations and modifications are intended to be included within the scope of the invention as defined in the appended claims.

What is claimed is:

1. A method for routing cells in a wireless communications network, said communications network including a plurality of switching nodes and said cells being routed according to destination-rooted virtual path identifier (VPI) trees, said method comprising the steps of:

forming a set of VPI primary trees by determining all-pairs shortest paths for said nodes within said network, said set of primary trees including one tree rooted at each node in said network; and determining a set of secondary trees rooted at each node in said network for given destination nodes.

2. The method of claim 1, wherein said communications network is represented as a graph G(S,L), S being a set of nodes in said communications network and L a set of links coupling said nodes, said step of determining a set of secondary trees including the steps of:

updating link weights for links between said nodes in edges of said graph G(S,L), such that for each edge $e_{ij}$, a new assigned weight is $(w+\Sigma p_{ij})$, where $p_{ij}$ is the number of paths in all said primary trees that use edge $e_{ij}$; and defining all-pairs shortest paths for said graph G(S,L) using updated link weights from said step of updating.

3. The method of claim 1, wherein said communications network is represented as a graph G(S,L), S being a set of nodes in said communications network and L a set of links coupling said nodes, said step of determining a set of secondary trees including the steps of:

determining a set of edges $E_n$ through which a primary VPI tree $V_{nl}$ rooted at node n is routed;

updating link weights for links between said nodes of edges $e_{ij} \in E_n$ in the graph G(S,L) by assigning new weights $w'_{ij}=w_{ij}+p_{ij}$, where $p_{ij}$ is the number of paths in a primary VPI sink tree $V_{nl}$ traversing the edge $e_{ij}$, and $w_{ij}$ represent the weights used in computing said primary trees; and defining all-pairs shortest paths on the new graph including updated weights to thereby determine shortest paths from all nodes to a destination node.

4. The method of claim 1, wherein said communications network is represented as a graph G(S,L), S being a set of nodes in said communications network and L a set of links coupling said nodes, said step of determining a set of secondary trees including the steps of:

determining a set of edges $E_n$ through which a primary VPI tree $V_{nl}$ rooted at node n is routed;

updating link weights for links between said nodes of edges $e_{ij} \in E_n$ in the graph G(S,L) by assigning new weights $w'_{ij}=w_{ij}+p_{ij}$, where $P_{ij}$ is the number of paths in a primary VPI sink tree $V_{nl}$ traversing the edge $e_{ij}$ and $w_{ij}$ represent the weights used in computing said primary trees;

creating a graph G'(S, L−$E_n$) by eliminating from G(S,L) edges that are included in a primary sink tree rooted at n;

replacing each connected component of G'(S, L−$E_n$) by a new node, thereby creating an auxiliary graph G"(S', E');

marking each edge e in the graph G"(S', E'), with a two-tuple (i,j) denoting the nodes in G(S,L) that this edge represents;

defining all-pairs shortest paths for the auxiliary graph, G"(S', E') for a destination node n' such that connected component n' includes the node n, wherein a new tree from said all-pairs shortest paths is $V_{n'}$;

expanding the nodes n' in $V_{n'}$; and defining all-pairs shortest paths for the destination node n, thereby providing a maximally disjoint tree from the primary tree.

5. The method of claim 1, wherein said cells are ATM cells.

6. The method of claim 1, wherein said all-pairs shortest-paths are determined using Floyd-Warshall algorithms.

7. The method of claim 3, wherein said all-pairs shortest-paths are determined using a Dijkstra algorithm.

8. The method of claim 1, further including the step of dynamically updating said VPI trees in response to triggering events in said network.

9. The method of claim 8, wherein said triggering events are selected from the group consisting of congestion on a physical link in said network, physical link failure, node failure, node removal, addition of a physical link and addition of node to said network.

10. The method of claim 8, wherein said step of updating is performed according to a virtual trees routing protocol.

11. A wireless communications network including a plurality of switching nodes adapted to route cells in said network according to destination-rooted virtual path identifier (VPI) trees, said network configured according to the steps of:
forming a set of VPI primary trees by computing all-pairs shortest paths for said nodes within said network, said set of primary trees including one tree rooted at each node in said network; and
including a set of secondary trees rooted at each node in said network for given destination nodes.

12. The network of claim 11, wherein said communications network is represented as a graph G(S,L), S being a set of nodes in said communications network and L a set of links coupling said nodes, said set of secondary trees being determined according to the steps of:
updating link weights for links between said nodes in edges of said graph G(S,L), such that for each edge $e_{ij}$, a new assigned weight is $(w+\Sigma p_{ij})$, where $P_{ij}$ is the number of paths in all said primary trees that use edge $e_{ij}$; and
defining all-pairs shortest paths for said graph G(S,L) using updated link weights from said step of updating.

13. The network of claim 11, wherein said communications network is represented as a graph G(S,L), S being a set of nodes in said communications network and L a set of links coupling said nodes, said set of secondary trees being determined according to the steps of:
determining a set of edges $E_n$ through which a primary VPI tree $V_{nl}$ rooted at node n is routed;
updating link weights for links between said nodes of edges $e_{ij} \in E_n$ in the graph G(S,L) by assigning new weights $w'_{ij}=w_{ij}+p_{ij}$, where $p_{ij}$ is the number of paths in a primary VPI sink tree $V_{nl}$ traversing the edge $e_{ij}$, and $w_{ij}$ represent the weights used in computing said primary trees; and
defining all-pairs shortest paths on the new graph including updated weights to thereby determine shortest paths from all nodes to a destination node.

14. The network of claim 11, wherein said communications network is represented as a graph G(S,L), S being a set of nodes in said communications network and L a set of links coupling said nodes, said set of secondary trees being determined according to the steps of:
determining a set of edges $E_n$ through which a primary VPI tree $V_{nl}$ rooted at node n is routed;
updating link weights for links between said nodes of edges $e_{ij} \in E_n$ in the graph G(S,L) by assigning new weights $w_{ij}=w_{ij}+p_{ij}$, where $p_{ij}$ is the number of paths in a primary VPI sink tree $V_{nl}$ traversing the edge $e_{ij}$ and $w_{ij}$ represent the weights used in computing said primary trees;

creating a graph $G'(S, L-E_n)$ by eliminating from G(S,L) edges that are included in a primary sink tree rooted at n;
replacing each connected component of $G'(S, L-E_n)$ by a new node, thereby creating an auxiliary graph G"(S', E');
marking each edge e in the graph G"(S', E'), with a two-tuple (i,j) denoting the nodes in G(S,L) that this edge represents;
defining all-pairs shortest paths for the auxiliary graph, G"(S', E') for a destination node n' such that connected component n' includes the node n, wherein a new tree from said shortest path algorithm is $V_n$;
expanding the nodes n' in $V_n$; and
defining all-pairs shortest paths for the destination node n, thereby providing a maximally disjoint tree from the primary tree.

15. The network of claim 11, wherein said cells are ATM cells.

16. The network of claim 11, wherein said all-pairs shortest-paths are determined using Floyd-Warshall algorithms.

17. The network of claim 13, wherein said all-pairs shortest-paths are determined using a Dijkstra algorithm.

18. The network of claim 11, wherein said switching nodes are portable base stations.

19. A method for dynamically updating routing paths for cells traveling in a wireless communications network, said communications network including a plurality of switching nodes and said cells being routed according to destination-rooted virtual path identifier (VPI) trees, said method comprising the steps of:
detecting a trigger condition at a node i in said communications network indicative of a requirement to update one or more of said VPI trees, said trigger condition being a congested link in said communications network;
updating route structures and route states of said VPI trees in said communications network in response to said trigger condition; and
determining a candidate set of said VPI trees for redirection, said candidate set including "empty" VPIs, wherein an empty VPI has no assigned virtual channel identifiers (VCIs) thereon, said step of determining further including the substeps of:
creating a set of all VPIs using said congested link;
referencing a record of connections at said node i having been admitted with quality of service (QoS) guarantees to thereby rule out any non-empty VPIs.;
communicating with a root node of each potentially empty VPI to determine if a best-effort connection without QoS guarantees has been admitted on said VPI.

20. The method of claim 19, further including the steps of:
sending an explore-route message from said node i to all adjacent nodes in said network requesting accommodation for redirection of a VPI, wherein each of said adjacent nodes checks a transit VPIs data table to determine if an entry exists for said VPI;
initiating a check-resources-and-cycles-process to determine if a certain path has sufficient resources on links along said path to permit said redirection, said check resources-and-cycles-process also ensuring that no cycles are caused in the tree structure of said VPI.

21. The method of claim 20, wherein said check-resources-and cycles-process includes the steps of:

checking a data table to determine available resources on a link along the root of said VPI;

checking for cycles in said tree structure by determining whether a neighboring node is node i, wherein a redirection-rejection message is sent to a root node of said VPI if no available resources exist on said link or no loop condition is created, otherwise said explore-route message being sent on to a next node along said root of said VPI wherein subsequent to said explore-route message traversing all nodes in said root, said root node selects one route through which redirection is possible.

22. The method of claim 19, wherein if said node i determines that a sufficient number of reroutes have not been accomplished, said node i determines to delete itself from a VPI tree by means of a deletion procedure to thereby reduce traffic on said VPI tree by eliminating data generated by end-users coupled node i.

23. The method of claim 22, wherein said deletion procedure includes the steps of:

obtaining permission from a root node of said VPI tree for said deletion procedure;

determining whether node i is a leaf node on said VPI tree, said node i dropping itself from said VPI tree if determined to be a leaf node, and requesting downstream neighbor nodes from node i to perform redirection for said VPI tree if node i is not a leaf node.

24. The method of claim 20, wherein said node i determines that a sufficient number of reroutes have not been accomplished, further including the step of requesting inactivation of selected VPIs for said node i to thereby prevent new connections from being admitted to said selected VPIs.

25. The method of claim 22, wherein subsequent to said deletion procedure, said node i initiates an addition procedure to another VPI if node i has only two active VPIs to a given destination node in said network, said addition procedure including the steps of:

communicating with neighbor nodes to determine different VPIs to a given destination node;

adding node i as a leaf node to one or more of said different VPIs.

26. A method for dynamically updating routing paths for cells traveling in a wireless communications network, said communications network including a plurality of switching nodes and said cells being routed according to destination-rooted virtual path identifier (VPI) trees, said method comprising the steps of:

detecting a trigger condition at a node i in said communications network indicative of a requirement to update one or more of said VPI trees, wherein said trigger condition is a failed link, wherein all VPIs traversing said failed link are considered empty, an empty VPI having no assigned virtual channel identifiers (VCIs) thereon; and updating route structures and route states of said VPI trees in said communications network in response to said trigger condition.

27. The method of claim 26, wherein said trigger condition is a failed node said redirection for said failed node being multiple conditions of said failed link occurring at said failed node.

28. The method of claim 26, further including the steps of:

creating a set of VPIs using said failed link for each destination node l;

determining if more than two functional VPIs exist to destination node l;

performing a selective freeze of VPIs at nodes downstream from node i, thereby preventing said nodes from sending cells to node i, if more than two functional VPIs exist to destination node l, and redirecting VPIs in said set of VPIs using said failed link to thereby create multiple routes to said to destination node l, if two or fewer functional VPIs exist to destination node l.

29. A method for dynamically updating routing paths for cells traveling in a wireless communications network, said communications network including a plurality of switching nodes and said cells being routed according to destination-rooted virtual path identifier (VPI) trees, said method comprising the steps of:

detecting a trigger condition at a node i in said communications network indicative of a requirement to update one or more of said VPI trees wherein said trigger condition is the addition of a link in said network to replace a previously failed link;

updating route structures and route states of said VPI trees in said communications network in response to said trigger condition;

determining a set of VPIs that were inactivated by a selective freeze procedure when said the link failure occurred;

activating said set of VPIs previously inactivated;

updating a data table at node i to indicate that a VPI from said set of VPIs previously inactivated is active;

sending selective unfreeze messages in a chained fashion to neighbor nodes downstream of a selected VPI in said communications network, wherein each node informs a root node of its activation; and updating a data table at said root node to reflect new activation of said set of VPIs and thereby incorporate the restored link in said network.

30. A method for dynamically updating routing paths for cells traveling in a wireless communications network, said communications network including a plurality of switching nodes and said cells being routed according to destination-rooted virtual path identifier (VPI) trees, said method comprising the steps of:

detecting a trigger condition at a node i in said communications network indicative of a requirement to update one or more of said VPI trees, wherein said trigger condition is the addition of a link in said network between two ports not previously connected;

updating route structures and route states of said VPI trees in said communications network in response to said trigger condition;

selecting a set of empty VPIs that pass through other links in said network; and redirecting said other links onto the new link being added.

31. A method for dynamically updating routing paths for cells traveling in a wireless communications network, said communications network including a plurality of switching nodes and said cells being routed according to destination-rooted virtual path identifier (VPI) trees, said method comprising the steps of:

detecting a trigger condition at a node i in said communications network indicative of a requirement to update one or more of said VPI trees, wherein said trigger condition is the addition of said node i into said network;

updating route structures and route states of said VPI trees in said communications network in response to said trigger condition;

communicating with neighbor nodes in said network to determine a set of VPI trees to join as a leaf node; and joining said set of VPI trees as a leaf node.

32. The method of claim 31, wherein an additional resource check procedure is used to select neighbor nodes through which node i should join a given VPI tree if multiple neighbor nodes exist as potential candidates through which to join said given VPI tree, further including the step of performing said additional resource check through said multiple neighbor nodes.

33. The method of claim 32, further including the step of creating VPI sink trees at said node i using a given sink tree creation procedure.

34. The method of claim 33, wherein said sink tree creation procedure is executed using a distributed version of the Bellman-Ford algorithm for a primary tree, further including the step of determining a set of secondary trees from topology and loading conditions of said network.

35. the method of claim 33, wherein said given sink tree creation procedure includes the steps of:

communicating with neighbor nodes to obtain a list of VPIs routed at said neighbor nodes;

selecting a set of least-loaded trees from said list of VPIs such that all other nodes in said network are enabled to reach said node i; and updating data tables at said other nodes to thereby include said set of least-loaded trees.

36. A method for dynamically updating routing paths for cells traveling in a wireless communications network, said communications network including a plurality of switching nodes and said cells being routed according to destination-rooted virtual path identifier (VPI) trees, said method comprising the steps of:

detecting a trigger condition at a node i in said communications network indicative of a requirement to update one or more of said VPI trees, wherein said trigger condition is a congestion incident, said congestion incident being defined as $C-U<T$ for a period of $\tau$, where C represents bandwidth capacity of a connection, U represents usage and T represents a reserved capacity to absorb bursts when needed; and updating route structures and route states of said VPI trees in said communications network in response to said trigger condition.

37. The method of claim 21, wherein one of said available resources is spare capacity, spare capacity being defined as $C-A-T$, where C represents bandwidth capacity of a connection, A represents allocated capacity and T represents a reserved capacity to absorb bursts when needed.

38. The method of claim 36, wherein said cells are ATM cells.

39. The method of claim 36, wherein said nodes are portable base station switching devices.

40. The method of claim 21, wherein said available resources are selected from the group consisting of spare capacity and hop count.

* * * * *